(12) United States Patent
Osawa et al.

(10) Patent No.: US 9,322,965 B2
(45) Date of Patent: Apr. 26, 2016

(54) OPTICAL MEMBER

(71) Applicant: ASAHI GLASS COMPANY, LIMITED, Chiyoda-ku (JP)

(72) Inventors: Mitsuo Osawa, Tokyo (JP); Masahiro Mori, Tokyo (JP); Katsushi Miyake, Tokyo (JP); Katsushi Kamijyo, Shizuoka-ken (JP); Mitsuyuki Tatemura, Shizuoka-ken (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 102 days.

(21) Appl. No.: 14/166,080

(22) Filed: Jan. 28, 2014

(65) Prior Publication Data
US 2014/0139912 A1 May 22, 2014

Related U.S. Application Data

(63) Continuation of application No. PCT/JP2012/068794, filed on Jul. 25, 2012.

(30) Foreign Application Priority Data

Jul. 28, 2011 (JP) .................................. 2011-165942

(51) Int. Cl.
G02B 5/28 (2006.01)
(52) U.S. Cl.
CPC ................ *G02B 5/282* (2013.01); *G02B 5/285* (2013.01); *G02B 5/286* (2013.01)
(58) Field of Classification Search
CPC ........ G02B 5/282; G02B 5/285; G02B 5/286; G02B 5/208; G02B 5/28; G02B 1/115

USPC .......................................... 359/360, 588, 589
See application file for complete search history.

(56) References Cited

U.S. PATENT DOCUMENTS 4,309,075 A * 1/1982 Apfel et al. .................... 359/586
4,373,782 A * 2/1983 Thelen ............................ 398/79

(Continued)

FOREIGN PATENT DOCUMENTS

CN 1979230 A 6/2007
EP 1 227 358 7/2002

(Continued)

OTHER PUBLICATIONS

U.S. Appl. No. 14/556,338, filed Dec. 1, 2014, Tatemura.

(Continued)

*Primary Examiner* — Jordan Schwartz
(74) *Attorney, Agent, or Firm* — Oblon, McClelland, Maier & Neustadt, L.L.P.

(57) ABSTRACT

An optical member has: a transparent substrate; and a dielectric multilayer on the transparent substrate formed by stacking a plurality of unit refractive index layers each formed of a high-refractive index layer having a refractive index of 2 or more and a low-refractive index layer having a refractive index of 1.6 or less. In the optical member, a total number of the unit refractive index layers is 15 or more, and a number of the unit refractive index layers satisfying a condition of $n_H d_H / n_L d_L \geq 3$ is 10 or more, $n_H d_H$ represents an optical thickness of the high-refractive index layer, and $n_L d_L$ represents an optical thickness of the low-refractive index layer.

14 Claims, 11 Drawing Sheets

(56) References Cited

U.S. PATENT DOCUMENTS

| | | |
|---|---|---|
| 2002/0135706 A1 | 9/2002 | Sawamura |
| 2007/0030569 A1* | 2/2007 | Lu et al. .................. 359/586 |
| 2007/0127126 A1 | 6/2007 | Terada |
| 2010/0188737 A1 | 7/2010 | Terada |
| 2012/0243077 A1 | 9/2012 | Osawa et al. |

FOREIGN PATENT DOCUMENTS

| | | |
|---|---|---|
| JP | 05-207350 | 8/1993 |
| JP | 11-101913 | 4/1999 |
| JP | 11-202127 | 7/1999 |
| JP | 2002-040239 | 2/2002 |
| JP | 2002-296414 | 10/2002 |
| JP | 2005-114812 | 4/2005 |
| JP | 2006-285196 | 10/2006 |
| JP | 2007-183525 | 7/2007 |
| JP | 2008-070825 | 3/2008 |
| JP | 2010-078714 | 4/2010 |

OTHER PUBLICATIONS

International Preliminary Report on Patentability issued Feb. 6, 2014 in PCT/JP2012/068794 filed Jul. 25, 2012.

Written Opinion issued Oct. 30, 2012, in PCT/JP2012/068794 filed Jul. 25, 2012 (English translation only).

U.S. Appl. No. 14/099,328, filed Dec. 6, 2013, Hasegawa, et al.

International Search Report issued Oct. 30, 2012 in PCT/JP2012/068794 filed Jul. 25, 2012.

U.S. Appl. No. 14/728,115, filed Jun. 2, 2015, Tatemura.

* cited by examiner

OPTICAL MEMBER

CROSS-REFERENCE TO RELATED APPLICATIONS

This application is a continuation of prior International Application No. PCT/JP2012/068794, filed on Jul. 25, 2012 which is based upon and claims the benefit of priority from Japanese Patent Application No. 2011-165942 filed on Jul. 28, 2011; the entire contents of all of which are incorporated herein by reference.

FIELD

Embodiments relates to an optical member having a dielectric multilayer.

BACKGROUND

In an imaging device such as a digital still camera, an image of subject is captured by using a solid-state image sensor such as a CCD (Charge Coupled Device) and a CMOS image sensor (Complementary Metal Oxide Semiconductor Image Sensor). Each of these solid-state image sensors has a spectral sensitivity of from visible region to a near-infrared-wavelength region in the vicinity of 1100 nm, and so it is not possible to obtain a good color reproducibility as it is. Thus, the spectral sensitivity is corrected to correspond to a normal luminosity factor of human being by using a filter which shields light in the infrared-wavelength region. Specifically, the filter that shields light in the infrared-wavelength region is provided in an optical path from an imaging lens to the solid-state image sensor. The filter used for such purpose is required to have a high transmittance of light in the visible wavelength region, and a dielectric multilayer in which each of a plurality of high-refractive index layers and each of a plurality of low-refractive index layers are alternately stacked is employed, for example.

However, the filter having the dielectric multilayer has an incident angle dependence of light. The incident angle dependence shifts a cut-off wavelength when the filter is applied to the imaging device and the incident angle of light through the imaging lens with the filter varies. Thus, a color tone at a center portion of a shot image and a color tone at a peripheral portion of the shot image may be changed. Hereinafter, the incident angle dependence of light is simply referred to as the incident angle dependence.

A method of reducing the incident angle dependence is known. The method uses a first dielectric multilayer and a second dielectric multilayer. A width of reflecting band of the first dielectric multilayer is set to be narrower than a width of reflecting band of the second dielectric multilayer. The position of a short-wavelength-side edge of the second dielectric multilayer is set to be at a position between a short-wavelength-side edge and a long-wavelength-side edge of the reflecting band of the first dielectric multilayer. In particular, an average refractive index of the entire first dielectric multilayer is set to be higher than an average refractive index of the entire second dielectric multilayer. In the method as described above, the incident angle dependence is reduced by the first dielectric multilayer having the high average refractive index, and a wide reflecting band is secured by using the first dielectric multilayer together with the second dielectric multilayer.

Further, a dichroic mirror is known. The dichroic mirror has a first selective transmission multilayer formed of a high-refractive index layer and a medium-refractive index layer, and a second selective transmission multilayer formed of a high-refractive index layer and a low-refractive index layer with a large refractive index ratio. In the dichroic mirror, the incident angle dependence is reduced by the first selective transmission multilayer formed of the high-refractive index layer and the medium-refractive index layer.

SUMMARY

When the average refractive index of the dielectric multilayer is simply increased, the width of the reflecting band tend to be narrowed, and the reflectance is tend to be lowered. For example, in the dielectric multilayer, each of high-refractive index layers made of $TiO_2$ and each of medium-refractive index layers made of $Ta_2O_5$ or the like having a refractive index higher than that of $SiO_2$ are alternately and repeatedly stacked. For this reason, it is known that a method of using a dielectric multilayer with high average refractive index and a dielectric multilayer with low average refractive index. The dielectric multilayer with high average refractive index is formed of a high-refractive index layer made of $TiO_2$ and a medium-refractive index layer made of $Ta_2O_5$ or the like having a refractive index higher than that of $SiO_2$. The dielectric multilayer with low average refractive index is formed of a high-refractive index layer and a low-refractive index layer. However, there is a need to additionally form the refractive index layers made of different composing materials, so that the method is not always excellent in productivity.

An optical member of embodiments has: a transparent substrate; and a dielectric multilayer on the transparent substrate including a plurality of unit refractive index layers each formed of a high-refractive index layer having a refractive index of 2 or more and a low-refractive index layer having a refractive index of 1.6 or less. In the optical member of embodiments, a total number of the unit refractive index layers in the dielectric multilayer is 15 or more, and a number of the unit refractive index layers in the dielectric multilayer satisfying a condition of $n_H d_H / n_L d_L \geq 3$ is 10 or more. Here, $n_H d_H$ represents an optical thickness of the high-refractive index layer in the unit refractive index layer, and $n_L d_L$ represents an optical thickness of the low-refractive index layer in the unit refractive index layer.

DETAILED DESCRIPTION

Figure 1:
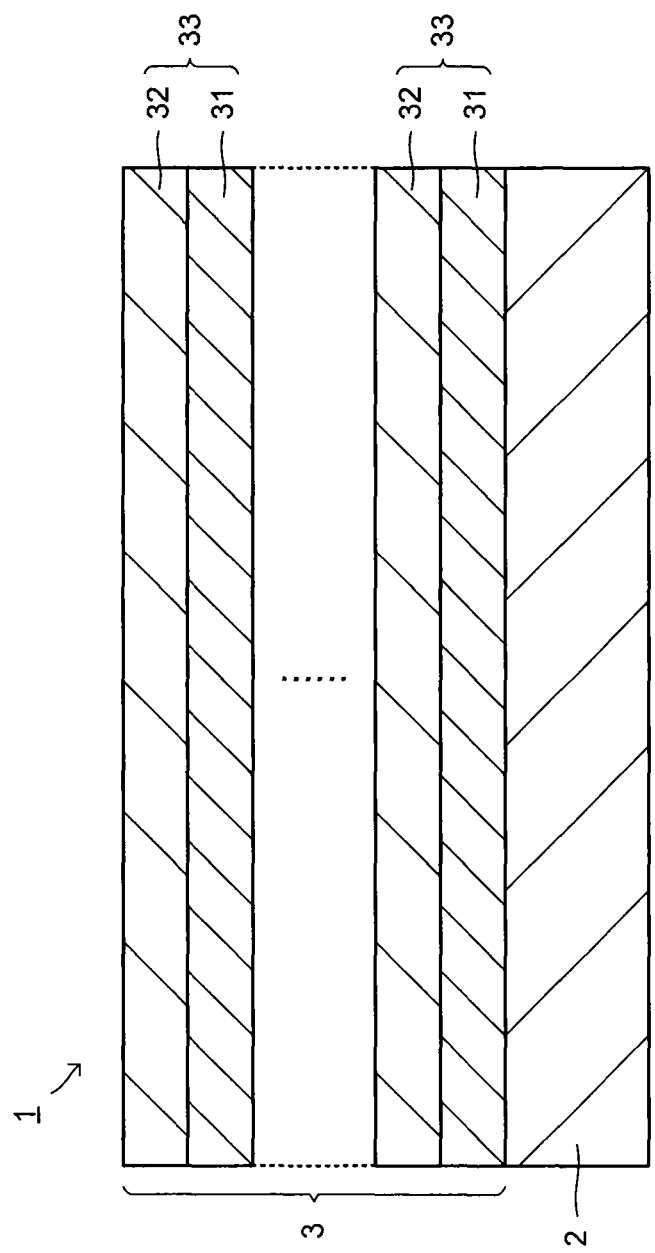
FIG. 1 is a sectional diagram illustrating an embodiment of an optical member.

Hereinafter, an optical member of embodiments will be described. An optical member 1 of embodiments has a transparent substrate 2 and a dielectric multilayer 3 formed on the transparent substrate 2. The dielectric multilayer 3 is configured by stacking a plurality of unit refractive index layers 33 each formed of a high-refractive index layer 31 having a refractive index of 2 or more and a low-refractive index layer 32 having a refractive index of 1.6 or less. Note that the refractive index means a refractive index with respect to light with a wavelength of 550 nm.

The optical member 1 of embodiments has a total number of the unit refractive index layers 33 in the dielectric multilayer 3 of 15 or more. Further, a number of the unit refractive index layers 33 in the dielectric multilayer 3 satisfying a condition of $n_H d_H / n_L d_L \geq 3$ is 10 or more. Here, $n_H d_H$ represents an optical thickness of the high-refractive index layer 31 in the unit refractive index layer 33, and $n_L d_L$ represents an optical thickness of the low-refractive index layer 32 in the unit refractive index layer 33.

Note that the dielectric multilayer 3 does not always have to be configured only by the unit refractive index layers 33, and it may also have, in one or both of the thickness direction, namely, the stack direction of the unit refractive index layers 33, the high-refractive index layer 31 or the low-refractive index layer 32 which exists by itself without configuring the unit refractive index layer 33. Further, regarding the unit refractive index layers 33 whose number is 10 or more and which satisfy the condition of $n_H d_H / n_L d_L \geq 3$, $n_H d_H / n_L d_L$ of each of the layers may be the same or different. Hereinafter, such a dielectric multilayer 3 is sometimes described as a first dielectric multilayer 3.

In the optical member 1 of embodiments, the number of the unit refractive index layers 33 in the dielectric multilayer 3 satisfying the condition of $n_H d_H / n_L d_L \geq 3$ is set to 10 or more. Thus, by using a high-refractive index layer 31 and a low-refractive index layer 32, incident angle dependence is reduced effectively. Concretely, a difference between a 50% transmission wavelength under an incident angle of 0° and a 50% transmission wavelength under an incident angle of 30° in a cut-off band between a transmitting band and a reflecting band, which is normally a cut-off band in the vicinity of 650 nm, can be reduced to 16 nm or less, for example. Hereinafter, the above-described difference is sometimes described as an infrared-side half-value wavelength shift amount or simply a wavelength shift amount. In the optical member 1 of embodiments, a number of the unit refractive index layers 33 satisfying a condition of $n_H d_H / n_L d_L \geq 5$ is preferably 10 or more, from a point of view of further effectively reducing the incident angle dependence.

The total number of the unit refractive index layers 33 in the dielectric multilayer 3, and the number of the unit refractive index layers 33 in the dielectric multilayer 3 satisfying the condition of $n_H d_H / n_L d_L \geq 3$, preferably $n_H d_H / n_L d_L \geq 5$, are preferably larger numbers, from a point of view of reducing the incident angle dependence and improving a transmittance ripple, namely, a flatness of spectral transmittance. For example, the total number of the unit refractive index layers 33 in the dielectric multilayer 3 is preferably 30 or more, and is more preferably 35 or more. Further, the number of the unit refractive index layers 33 in the dielectric multilayer 3 satisfying the condition of $n_H d_H / n_L d_L \geq 3$, preferably $n_H d_H / n_L d_L \geq 5$ is preferably 15 or more, and is more preferably 18 or more.

By setting the total number of the unit refractive index layers 33 in the dielectric multilayer 3, and the number of the unit refractive index layers 33 in the dielectric multilayer 3 satisfying the condition of $n_H d_H / n_L d_L \geq 3$, preferably $n_H d_H / n_L d_L \geq 5$, to fall within the above-described range, it becomes easy to reduce the difference between the 50% transmission wavelength under the incident angle of 0° and the 50% transmission wavelength under the incident angle of 30° in the cut-off band in the vicinity of 650 nm, in particular, to 16 nm or less, and to reduce the transmittance ripple.

The total number of the unit refractive index layers 33 in the dielectric multilayer 3, and the number of the unit refractive index layers 33 in the dielectric multilayer 3 satisfying the condition of $n_H d_H / n_L d_L \geq 3$, preferably $n_H d_H / n_L d_L \geq 5$, are preferably larger numbers, from a point of view of shielding infrared region. However, the numbers are preferably reduced from a point of view of productivity. The total number of the unit refractive index layers 33 in the dielectric multilayer 3 is preferably 45 or less, and is more preferably 40 or less. Further, the number of the unit refractive index layers 33 in the dielectric multilayer 3 satisfying the condition of $n_H d_H / n_L d_L \geq 3$, preferably $n_H d_H / n_L d_L \geq 5$, is preferably 35 or less, and is more preferably 30 or less.

Further, the unit refractive index layers 33 in the dielectric multilayer 3 satisfying the condition of $n_H d_H / n_L d_L \geq 3$, preferably $n_H d_H / n_L d_L \geq 5$, preferably satisfy a condition of $5 \leq n_H d_H / n_L d_L \leq 8$. A number of the unit refractive index layers 33 in the dielectric multilayer 3 satisfying the condition of $5 \leq n_H d_H / n_L d_L \leq 8$ is preferably 10 or more, and is more preferably 15 or more. By designing as above, it becomes easy to set the difference between the 50% transmission wavelength under the incident angle of 0° and the 50% transmission wavelength under the incident angle of 30° in the cut-off band in the vicinity of 650 nm, to 16 nm or less, and to reduce the transmittance ripple.

An average $n_H d_H / n_L d_L$ being an average value of $n_H d_H / n_L d_L$ in the entire unit refractive index layers 33 in the dielectric multilayer 3, namely, a total sum of the unit refractive index layers 33 satisfying the condition of $n_H d_H / n_L d_L \geq 3$ and the unit refractive index layers 33 satisfying the condition of $n_H d_H / n_L d_L < 3$, is preferably 4.5 to 6. Particularly, when the total number of the unit refractive index layers 33 in the dielectric multilayer 3 is large, for example, when the total number of the unit refractive index layers 33 in the dielectric multilayer 3 is 30 or more, the average $n_H d_H / n_L d_L$ is preferably 4.5 to 5.3.

The $n_H d_H / n_L d_L$ of each of the unit refractive index layers 33 in the dielectric multilayer 3 is not always limited as long as it satisfies the above-described condition. However, it is preferably 0.1 to 25, and is preferably 0.2 to 20. Note that as described above, the unit refractive index layers 33 whose number is 10 or more in the dielectric multilayer 3 satisfy the condition of $n_H d_H / n_L d_L \geq 3$, preferably satisfy the condition of $n_H d_H / n_L d_L \geq 5$, and more preferably satisfy the condition of $5 \leq n_H d_H / n_L d_L \leq 8$.

An average optical thickness $n_H d_H$ being an average value of optical thicknesses $n_H d_H$ of the high-refractive index layers 31 in the dielectric multilayer 3 is preferably 200 to 310 nm, and is more preferably 210 to 300 nm. An average optical thickness $n_L d_L$ being an average value of optical thicknesses $n_L d_L$ of the low-refractive index layers 32 in the dielectric multilayer 3 is preferably 40 to 70 nm, and is more preferably 40 to 65 nm. Particularly, when the total number of the unit refractive index layers 33 in the dielectric multilayer 3 is large, for example, when the total number of the unit refractive index layers 33 in the dielectric multilayer 3 is 30 or more, the average optical thickness $n_H d_H$ being the average value of the optical thicknesses $n_H d_H$ of the high-refractive index layers 31 is preferably 210 to 270 nm, and is more preferably 220 to 260 nm. Further, the average optical thickness $n_L d_L$ being the average value of the optical thicknesses $n_L d_L$ of the low-refractive index layers 32 in the dielectric multilayer 3 is preferably 45 to 70 nm, and is more preferably 45 to 65 nm.

The optical thickness $n_H d_H$ of each of the high-refractive index layers 31 in the dielectric multilayer 3 is not always limited as long as it satisfies the above-described condition, but, it is preferably 10 to 350 nm. The optical thickness $n_L d_L$ of each of the low-refractive index layers 32 in the dielectric multilayer 3 is also not always limited as long as it satisfies the above-described condition, but, it is preferably 10 to 140 nm.

Although a composing material of the high-refractive index layer 31 is not always limited as long as the refractive index of 2 or more is provided, as the composing material, $TiO_2$, $Nb_2O_5$, $Ta_2O_5$, a composite oxide of these, or the like can be cited, for example. Further, although a composing material of the low-refractive index layer 32 is also not always limited as long as the refractive index of 1.6 or less is provided, as the composing material, $SiO_2$, $MgF_2$, a composite oxide of these, or the like can be cited, for example. It is also possible that each of the high-refractive index layer 31 and the low-refractive index layer 32 contains an additive for adjusting the refractive index, within a range of satisfying the above-described refractive index. As the additive, there can be cited, for example, $SiO_2$, $Al_2O_3$, $CeO_2$, $FeO_2$, $HfO_2$, $In_2O_3$, $MgF_2$, $Nb_2O_3$, $SnO_2$, $Ta_2O_3$, $TiO_2$, $Y_2O_3$, $ZnO$, $ZrO_2$, $NiO$, ITO (Indium Tin Oxide), ATO (Antimony doped Tin Oxide), MgO, or the like.

Each of the high-refractive index layer 31 and the low-refractive index layer 32 is preferably formed of a single composing material. By designing as above, a thickness adjusting mechanism when forming the dielectric multilayer 3 is only required to deal with only the two composing materials, and only two types of the materials are required, so that it becomes possible to improve the productivity in a formation process.

The high-refractive index layer 31 and the low-refractive index layer 32 are formed by, for example, a sputtering method, a vacuum deposition method, an ion beam method, an ion plating method, or a CVD (Chemical Vapor Deposition) method. With the use of these formation methods, it is possible to relatively easily form the respective refractive index layers while controlling the thicknesses of the respective refractive index layers with high accuracy. Further, the sputtering method and the ion plating method perform so-called plasma atmospheric treatment, so that an adhesiveness of the dielectric multilayer 3 with respect to the transparent substrate 2 can be improved.

The transparent substrate 2 may be colorless or colored one, a shape thereof is not particularly limited as long the transparent substrate 2 can make light in a visible wavelength region transmit therethrough, and as the shape, a plate shape, a film shape, a block shape, a lens shape or the like can be cited, for example.

As a composing material of the transparent substrate 2, there can be cited a glass, a crystal such as a quartz crystal, lithium niobate and sapphire, a polyester resin such as polyethylene terephthalate (PET) and polybutylene terephthalate (PBT), a polyolefin resin such as polyethylene, polypropylene and ethylene-vinyl acetate copolymer, a norbornene resin, an acrylic resin such as polyacrylate, and polymethyl methacrylate, a urethane resin, a vinyl chloride resin, a fluorocarbon resin, a polycarbonate resin, a polyvinyl butyral resin, a polyvinyl alcohol resin, or the like. These materials may have an absorption characteristic with respect to at least either of an ultraviolet wavelength region and an infrared-wavelength region.

A material which is transparent in a visible wavelength region can be used as the glass. The characteristics of the glass, such as the presence/absence of alkaline component and a measurement of linear expansion coefficient, is selected according to a device in which the glass is used, and a place in which the glass is disposed. The employment of boro-silicated glass is preferable since it is easy to process the glass, and it is possible to suppress the generation of scratch, foreign matter or the like on an optical surface. The employment of glass which does not contain an alkaline component is preferable since the glass has good adhesiveness, weather resistance and the like. Further, as the glass, it is also possible to employ an absorption-type glass which is obtained by adding CuO or the like to a fluorophosphate glass or a phosphate glass, and which has absorption in the infrared-wavelength region.

The transparent substrate 2 preferably has absorption in the infrared-wavelength region. If the transparent substrate 2 has absorption in the infrared-wavelength region when the optical member 1 of embodiments is used as a near-infrared cut filter for an imaging device, it becomes possible to perform color correction to obtain a luminosity factor characteristic close to a luminosity factor characteristic of human being. The dielectric multilayer 3 is used for the purpose of supplementing absorption in a wavelength region in which the absorption of the transparent substrate 2 is not sufficient. By using the dielectric multilayer 3, a spectral characteristic with low incident angle dependence can be achieved, so that no adverse effect is exerted on the spectral characteristic of the transparent substrate 2. For this reason, it becomes possible to obtain the optical member 1 having a good characteristic as the near-infrared cut filter for the imaging device.

A crystal such as a quartz crystal, lithium niobate, and sapphire is used as a low-pass filter or a wavelength plate for reducing moire and false color, in an imaging device such as a digital still camera, a digital video camera, a surveillance camera, a camera for automobile use, and a web camera. By giving a function of low-pass filter or wavelength plate to the optical member 1, a size and a thickness of the imaging device can be reduced, for example.

To a solid-state image sensor or a solid-state image sensor package in an imaging device, a cover for protecting the solid-state image sensor is generally sealed in an air-tight state. By using the cover as the transparent substrate 2, it is possible to give an infrared-shielding function to the cover, and to reduce the incident angle dependence. As a material of the cover, there can be cited a crystal quartz, a glass, or a resin, but, it is preferable to use a crystal quartz or a glass from a point of view of heat resistance. When a resin is selected, it is preferable to employ a material excellent in heat resistance such as, for example, an acrylic resin, a silicone resin, a fluorocarbon resin, and an organic-inorganic hybrid material containing silsesquioxane or the like.

The dielectric multilayer 3 may include the following adjusting part. Although the dielectric multilayer 3 can achieve the spectral characteristic with low incident angle dependence, by configuring a part thereof as the adjusting part, it is possible to further reduce the infrared-side half-value wavelength shift amount, in particular. For example, with the use of the dielectric multilayer 3 including the adjusting part, it is possible to set the infrared-side half-value wavelength shift amount of the optical member 1 to 10 nm or less.

The spectral characteristic of the adjusting part highly depend on the incident angle. A spectral form obtained by the adjusting part changes according to the incident angle. Concretely, a spectral form obtained by the adjusting part in the vicinity of near-infrared-side half-value wavelength changes largely according to the incident angle. Thus, in the spectral characteristic of the entire dielectric multilayer 3, a wavelength shift amount in the vicinity of the near-infrared-side half-value wavelength becomes small. Namely, a spectral form in the vicinity of the near-infrared-side half-value wavelength obtained by the dielectric multilayer 3 except the adjusting part shifts in a parallel manner in a similar shape in accordance with the oblique incidence. However, the spectral form obtained by the adjusting part shifts with deformation in accordance with the oblique incidence. Namely, the spectral form obtained by the adjusting part is not a similar shape in the wave shift. By combining these, it is possible to reduce the spectral form shift amount, especially the spectral form shift amount of the near-infrared-side half-value wavelength by utilizing the deformation of spectral form. Note that the deformation of spectral form at the time of oblique incidence obtained by the adjusting part as described above is caused by a change in the optical thickness in accordance with a change in the incident angle.

The adjusting part is configured by at least a part of the high-refractive index layers 31 having the refractive index of 2 or more and the low-refractive index layers 32 having the refractive index of 1.6 or less in the dielectric multilayer 3. A total number of the high-refractive index layers 31 and the low-refractive index layers 32 is preferably 10 or more. $T_H/T_L$ is preferably 1.5 or less. Here, $T_H$ represents an average optical thickness of the high-refractive index layers 31, and $T_L$ represents an average optical thickness of the low-refractive index layers 32. By designing as above, it is possible to achieve the spectral characteristic as described above.

Note that the average optical thickness $T_H$ of the high-refractive index layers 31 is obtained by dividing a sum of the optical thicknesses of the high-refractive index layers 31 forming the adjusting part by the number of the high-refractive index layers 31 forming the adjusting part. In like manner, the average optical thickness $T_L$ of the low-refractive index layers 32 is obtained by dividing a sum of the optical thicknesses of the low-refractive index layers 32 forming the adjusting part by the number of the low-refractive index layers 32 forming the adjusting part. Here, the adjusting part does not always have to be formed of 10 layers or more which are continuously stacked, and it is also possible to be formed by being divided into two or more of portions. When the adjusting part is formed in a divided manner, a number of layers of at least one portion is preferably 10 or more. Further, when the adjusting part is formed in a divided manner, each portion does not always have to have $T_H/T_L$ of 1.5 or less, and it is only required that the entire part as a result of combining all of the portions has $T_H/T_L$ of 1.5 or less.

Basically, the total number of layers of the adjusting part is preferably large, since it becomes easy to obtain a predetermined spectral characteristic as the number becomes larger. However, the total number of layers is preferably 100 or less, and is preferably 50 or less from a point of view of productivity and the like. Further, although $T_H/T_L$ is also not always limited as long as it is 1.5 or less, it is preferably 1.0 or less, and is more preferably 0.9 or less, since it is easy to obtain the predetermined spectral characteristic. Normally, $T_H/T_L$ is preferably 0.1 or more, and is more preferably 0.3 or more.

An average wavelength shift amount under a transmittance of 1 to 95% in an infrared-side cut-off region in the dielectric multilayer 3 when the adjusting part is used and that when the adjusting part is not used are not different almost at all. It can be considered that this is because a spectral characteristic obtained by the configuration of the dielectric multilayer 3 except the adjusting part exerts dominant influence on the spectral form shift under the oblique incidence in the dielectric multilayer 3. However, when the optical member is used as a near-infrared cut filter for an imaging device, by using the adjusting part, it is possible to reduce a spectral form shift in a region in which a transmittance exceeds 50%. Accordingly, it is possible to reduce the incident angle dependence in a wavelength range of red region, which can contribute to an improvement of an image in the imaging device.

From the viewpoints described above, the optical member 1 having the adjusting part preferably has the following spectral characteristic. Specifically, it is preferable that a shift amount in a wavelength region in which a transmittance on a near-infrared side becomes 50% to 90% when the incident angle θ is changed from 0° to 30°, becomes 10 nm or less. Accordingly, a wavelength shift in the wavelength range of the red region (in the vicinity of 630 nm) is suppressed, which can contribute to the improvement of the image in the imaging device. Further, in order to achieve this effect, the near-infrared-side half-value wavelength is preferably in a range of 600 to 700 nm, and is more preferably in a range of 620 to 680 nm at the incident angle θ of 0°.

Figure 2:
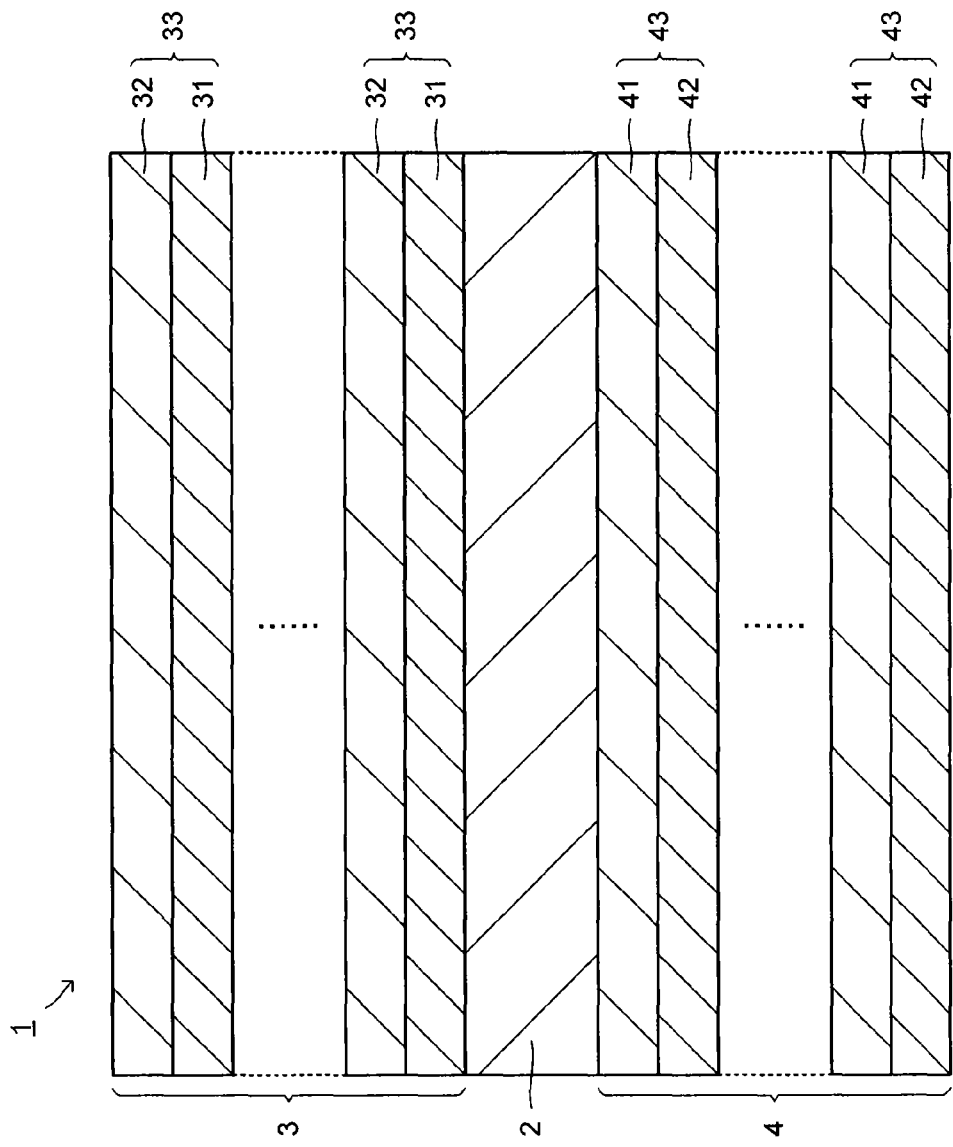
FIG. 2 is a sectional diagram illustrating another embodiment of the optical member.

As illustrated in FIG. 2, on the optical member 1, it is also possible to provide, in addition to the above-described first dielectric multilayer 3, a second dielectric multilayer 4. For example, the second dielectric multilayer 4 is provided on a main surface, of the transparent substrate 2, on the opposite side of a main surface on which the first dielectric multilayer 3 is provided. The second dielectric multilayer 4 shields a region on an ultraviolet wavelength region and a long-wavelength side of an infrared-wavelength region.

For example, the second dielectric multilayer 4 has a plurality of unit refractive index layers 43. Each unit refractive index layer is formed of a high-refractive index layer 41 having a refractive index of 2 or more and a low-refractive index layer 42 having a refractive index of 1.6 or less. A total number of the unit refractive index layers 43 in the second dielectric multilayer 4 is preferably 3 or more, and is more preferably 4 or more, from a point of view of effectively shielding light in the ultraviolet wavelength region and the infrared-wavelength region. Further, the total number of the unit refractive index layers 43 in the second dielectric multilayer 4 is preferably 55 or less, and is more preferably 50 or less, from a point of view of productivity and the like.

An average $n_H d_H/n_L d_L$ being an average value of $n_H d_H/n_L d_L$ of all of the unit refractive index layers 43 in the second dielectric multilayer 4 is preferably 0.8 to 1.5, and is more preferably 0.9 to 1.4. Further, the value of $n_H d_H/n_L d_L$ of each of the unit refractive index layers 43 in the second dielectric multilayer 4 is not always limited as long as it satisfies the above-described condition, but, it is preferably 0.1 to 10, and is preferably 0.1 to 8.

An average optical thickness $n_H d_H$ being an average value of optical thicknesses $n_H d_H$ of the high-refractive index layers 41 in the second dielectric multilayer 4 is preferably 100 to 250 nm, and is more preferably 120 to 230 nm. Further, an average optical thickness $n_L d_L$ being an average value of optical thicknesses $n_L d_L$ of the low-refractive index layers 42 in the second dielectric multilayer 4 is preferably 100 to 230 nm, and is more preferably 120 to 210 nm.

The optical thickness $n_H d_H$ of each of the high-refractive index layers 41 in the second dielectric multilayer 4 is not always limited as long as it satisfies the above-described condition. However, it is preferably 10 to 310 nm, and is more preferably 15 to 300 nm. The optical thickness $n_L d_L$ of each of the low-refractive index layers 42 in the second dielectric multilayer 4 is also not always limited as long as it satisfies the above-described condition. However, it is preferably 5 to 310 nm, and is more preferably 10 to 300 nm.

Although a composing material of the high-refractive index layer 41 is not always limited as long as the refractive index of 2 or more is provided, as the composing material, $TiO_2$, $Nb_2O_5$, $Ta_2O_5$, a composite oxide of these, or the like can be cited, for example. Further, although a composing material of the low-refractive index layer 42 is also not always limited as long as the refractive index of 1.6 or less is provided, as the composing material, $SiO_2$, $MgF_2$, a composite oxide of these, or the like can be cited, for example. It is also possible that each of the high-refractive index layer 41 and the low-refractive index layer 42 contains an additive for adjusting the refractive index, within a range of satisfying the above-described refractive index. As the additive, there can be cited, for example, $SiO_2$, $Al_2O_3$, $CeO_2$, $FeO_2$, $HfO_2$, $In_2O_3$, $MgF_2$, $Nb_2O_3$, $SnO_2$, $Ta_2O_3$, $TiO_2$, $Y_2O_3$, ZnO, $ZrO_2$, NiO, ITO (Indium Tin Oxide), ATO (Antimony doped Tin Oxide), MgO, or the like.

The high-refractive index layer 41 and the low-refractive index layer 42 are formed by, for example, a sputtering method, a vacuum deposition method, an ion beam method, an ion plating method, or a CVD method. With the use of these formation methods, it is possible to relatively easily form the respective refractive index layers while controlling the thicknesses of the respective refractive index layers with high accuracy. Further, the sputtering method and the ion plating method perform so-called plasma atmospheric treatment, so that an adhesiveness of the second dielectric multilayer 4 with respect to the transparent substrate 2 can be improved.

A difference between a 50% transmission wavelength under an incident angle of 0° and a 50% transmission wavelength under an incident angle of 30° in a cut-off band between a transmitting band and a reflecting band, which is normally a cut-off band in the vicinity of 650 nm, in the optical member 1 is preferably 20 nm or less, and is more preferably 18 nm or less. In the optical member 1, by setting a number of the unit refractive index layers 33 in the first dielectric multilayer 3 satisfying a condition of $n_H d_H / n_L d_L \geq 3$, preferably $n_H d_H / n_L d_L \geq 5$, to 10 or more, preferably 15 or more, and more preferably 18 or more, it is also possible to reduce the difference between the 50% transmission wavelength under the incident angle of 0° and the 50% transmission wavelength under the incident angle of 30°, to 16 nm or less, for example.

The optical member 1 is used as a near-infrared cut filter, namely, a luminosity factor correction filter for an imaging device such as a digital still camera, a digital video camera, a surveillance camera, a camera for automobile use, and a web camera, an automatic exposure meter. In the imaging device such as the digital still camera, the digital video camera, the surveillance camera, the camera for automobile use, and the web camera, the optical member 1 is arranged between an imaging lens and a solid-state image sensor, for example. In the automatic exposure meter, the optical member 1 is arranged on a front surface of a light-receiving element, for example.

Normally, the optical member 1 is arranged in a manner that a main surface side thereof on which the first dielectric multilayer 3 is stacked, is arranged on a side on which light ray is incident. For example, the main surface side is arranged on a side of an imaging lens when the optical member 1 is arranged between the imaging lens and a solid-state image sensor. When the optical member 1 is arranged as above, it is possible to effectively reduce the incident angle dependence and to suppress a change in a color tone at a center portion of an image to be shot and a color tone at a peripheral portion of the image to be shot.

In the imaging device, the optical member 1 may be arranged at a position separated from a front surface of the solid-state image sensor, and the optical member 1 may be directly attached to the solid-state image sensor or a package of the solid-state image sensor. A cover that protects the solid-state image sensor may be used as the optical member 1, as already described above. Further, it is also possible that the optical member 1 may be directly attached to a low-pass filter using a crystal such as a quartz crystal and lithium niobate for reducing moire and false color.

Figure 3:
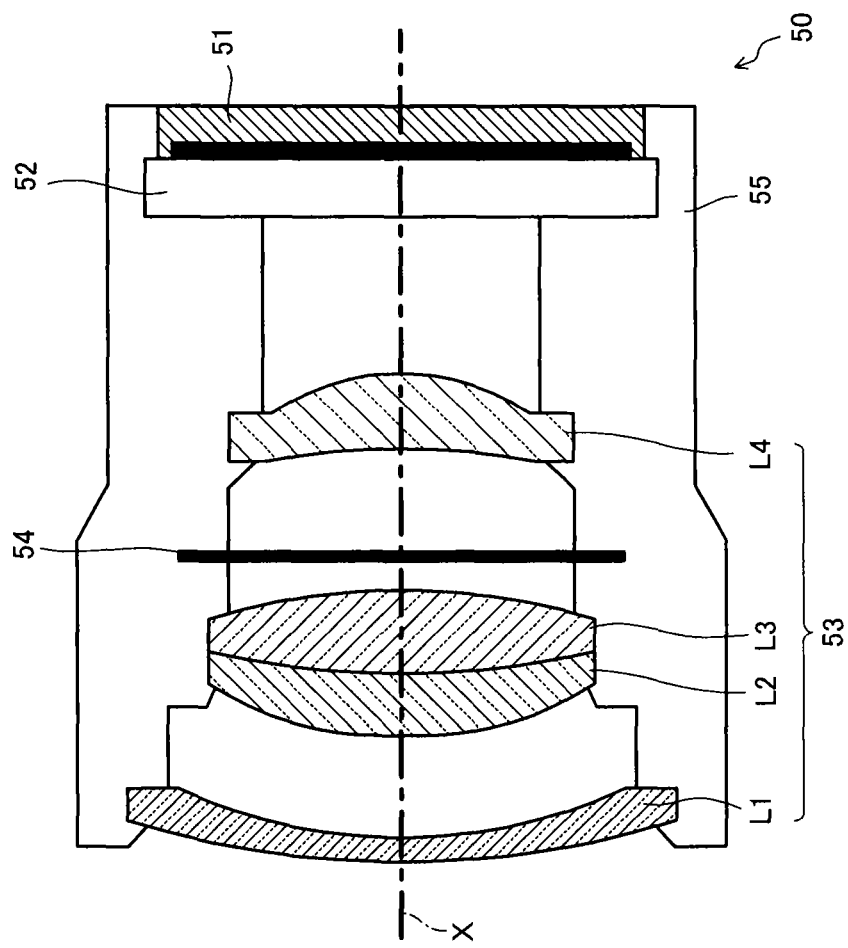
FIG. 3 is a sectional diagram illustrating an embodiment of an imaging device to which the optical member of the embodiments is applied.

FIG. 3 is a sectional diagram schematically illustrating an embodiment of an imaging device having a solid-state image sensor. An imaging device 50 has, for example, a solid-state image sensor 51, a cover glass 52, a lens group 53, an aperture 54, and a casing 55 fixing these.

The lens group 53 is arranged on an imaging plane side of the solid-state image sensor 51, and has, for example, a first lens L1, a second lens L2, a third lens L3, and a fourth lens L4. The aperture 54 is arranged between the third lens L3 and the fourth lens L4. The cover glass 52 is arranged on the side of the lens group 53 of the solid-state image sensor 51, and protects the solid-state image sensor 51 from an external environment. The solid-state image sensor 51 is an electronic component that converts light passed through the lens group 53 into an electrical signal. The solid-state image sensor 51 is a CCD, a CMOS, for example. The solid-state image sensor 51, the cover glass 52, the lens group 53, and the aperture 54 are arranged along an optical axis x.

In the imaging device 50, light that is incident from a subject side passes through the first lens L1, the second lens L2, the third lens L3, the aperture 54, the fourth lens L4, and the cover glass 52, to be incident on the solid-state image sensor 51. The solid-state image sensor 51 converts the incident light into an electrical signal, and outputs the electrical signal as an image signal.

The optical member 1 is used as, for example, the cover glass 52, or the lens group 53, namely, the first lens L1, the second lens L2, the third lens L3, or the fourth lens L4. In other words, a cover glass or a lens group of a conventional imaging device can be used as the transparent substrate 2, the first dielectric multilayer 3 and the second dielectric multilayer 4 of the optical member 1 are provided on a surface of the transparent substrate 2. By applying the optical member 1 to the cover glass 52 or the lens group 53 of the imaging device 50, it is possible to effectively reduce the incident angle dependence and to suppress a change in a color tone at a center portion of an image to be shot and a color tone at a peripheral portion of the image to be shot.

EXAMPLES

Hereinafter, the optical member 1 will be more concretely described while referring to examples.

Example 1

On one surface of a soda glass plate with a thickness of 1 mm as a transparent substrate 2, each of $TiO_2$ layers as high-refractive index layers 31 and each of $SiO_2$ layers as low-refractive index layers 32 are alternately stacked, as presented in Tables 1 to 3, to form a first dielectric multilayer 3. Further, on the other surface of the transparent substrate 2, each of $TiO_2$ layers as high-refractive index layers 41 and each of $SiO_2$ layers as low-refractive index layers 42 are alternately stacked, as presented in Tables 4 to 6, to form a second dielectric multilayer 4, thereby manufacturing an optical member 1.

Note that regarding the first dielectric multilayer 3, it is set that a total number of layers as a result of combining the high-refractive index layers 31 and the low-refractive index layers 32 is 76, namely, a total number of unit refractive index layers 33 is 38, in which a number of the unit refractive index layers 33 satisfying a condition of $n_H d_H / n_L d_L \geq 3$ is 28, a number of the unit refractive index layers 33 satisfying a condition of $n_H d_H / n_L d_L \geq 5$ is 25, and a number of the unit refractive index layers 33 satisfying a condition of $5 \leq n_H d_H / n_L d_L \leq 8$ is 23, an average $n_H d_H / n_L d_L$ is 4.8, an average optical thickness $n_H d_H$ is 232 nm, and an average optical thickness $n_L d_L$ is 54 nm.

Regarding the second dielectric multilayer 4, it is set that a total number of layers as a result of combining the high-refractive index layers 41 and the low-refractive index layers 42 is 90, namely, a total number of unit refractive index layers 43 is 45, an average $n_H d_H / n_L d_L$ is 1.2, an average optical thickness $n_H d_H$ is 143 nm, and an average optical thickness $n_L d_L$ is 145 nm.

Further, at an incident angle θ of 0°, the optical member 1 of the example 1 satisfies conditions that a transmittance in a range of 350 to 395 nm is less than 3%, an average transmittance in a range of 430 to 630 nm is 95% or more, a minimum transmittance in the range of 430 to 630 nm is 90% or more, an average transmittance in a range of 700 to 1000 nm is less than 0.1%, a maximum transmittance in the range of 700 to 1000 nm is less than 0.5%, an average transmittance in a range of 1000 to 1100 nm is less than 0.5%, and a maximum transmittance in the range of 1000 to 1100 nm is less than 2%, and it has points where the transmittance indicates 50%, within a range of 415±10 nm, and within a range of 650±6 nm.

TABLE 1

| Number of layer | Material | Physical thickness [nm] | Refractive index $n_H$, or refractive index $n_L$ | Optical thickness $n_H d_H$, or optical thickness $n_L d_L$ [nm] | $n_H d_H / n_L d_L$ |
|---|---|---|---|---|---|
| 1 | TiO$_2$ | 13.44 | 2.52 | 34 | 0.9 |
| 2 | SiO$_2$ | 25.4 | 1.46 | 37 | |
| 3 | TiO$_2$ | 78.02 | 2.52 | 197 | 4.2 |
| 4 | SiO$_2$ | 32.3 | 1.46 | 47 | |
| 5 | TiO$_2$ | 19.19 | 2.52 | 48 | 0.6 |
| 6 | SiO$_2$ | 53.82 | 1.46 | 79 | |
| 7 | TiO$_2$ | 82.78 | 2.52 | 209 | 9.3 |
| 8 | SiO$_2$ | 15.36 | 1.46 | 22 | |
| 9 | TiO$_2$ | 15.8 | 2.52 | 40 | 0.5 |
| 10 | SiO$_2$ | 53.16 | 1.46 | 78 | |
| 11 | TiO$_2$ | 5.21 | 2.52 | 13 | 0.3 |
| 12 | SiO$_2$ | 28.91 | 1.46 | 42 | |
| 13 | TiO$_2$ | 106.87 | 2.52 | 269 | 4.8 |
| 14 | SiO$_2$ | 38.62 | 1.46 | 56 | |
| 15 | TiO$_2$ | 116.39 | 2.52 | 293 | 5.2 |
| 16 | SiO$_2$ | 38.56 | 1.46 | 56 | |
| 17 | TiO$_2$ | 11.96 | 2.52 | 30 | 2.0 |
| 18 | SiO$_2$ | 10.12 | 1.46 | 15 | |
| 19 | TiO$_2$ | 107.75 | 2.52 | 272 | 4.8 |
| 20 | SiO$_2$ | 38.6 | 1.46 | 56 | |
| 21 | TiO$_2$ | 119.52 | 2.52 | 301 | 5.1 |
| 22 | SiO$_2$ | 40.11 | 1.46 | 59 | |
| 23 | TiO$_2$ | 119.24 | 2.52 | 300 | 5.1 |
| 24 | SiO$_2$ | 40.47 | 1.46 | 59 | |
| 25 | TiO$_2$ | 119 | 2.52 | 300 | 5.1 |
| 26 | SiO$_2$ | 40.07 | 1.46 | 59 | |
| 27 | TiO$_2$ | 119.01 | 2.52 | 300 | 5.2 |
| 28 | SiO$_2$ | 39.23 | 1.46 | 57 | |
| 29 | TiO$_2$ | 119.17 | 2.52 | 300 | 5.4 |
| 30 | SiO$_2$ | 38.15 | 1.46 | 56 | |

TABLE 2

| Number of layer | Material | Physical thickness [nm] | Refractive index $n_H$, or refractive index $n_L$ | Optical thickness $n_H d_H$, or optical thickness $n_L d_L$ [nm] | $n_H d_H / n_L d_L$ |
|---|---|---|---|---|---|
| 31 | TiO$_2$ | 119.3 | 2.52 | 301 | 5.5 |
| 32 | SiO$_2$ | 37.18 | 1.46 | 54 | |
| 33 | TiO$_2$ | 119.39 | 2.52 | 301 | 5.6 |
| 34 | SiO$_2$ | 36.73 | 1.46 | 54 | |
| 35 | TiO$_2$ | 119.45 | 2.52 | 301 | 5.6 |
| 36 | SiO$_2$ | 36.84 | 1.46 | 54 | |
| 37 | TiO$_2$ | 119.48 | 2.52 | 301 | 5.5 |
| 38 | SiO$_2$ | 37.18 | 1.46 | 54 | |
| 39 | TiO$_2$ | 119.51 | 2.52 | 301 | 5.5 |
| 40 | SiO$_2$ | 37.33 | 1.46 | 55 | |
| 41 | TiO$_2$ | 119.58 | 2.52 | 301 | 5.6 |
| 42 | SiO$_2$ | 37.02 | 1.46 | 54 | |
| 43 | TiO$_2$ | 119.7 | 2.52 | 302 | 5.7 |
| 44 | SiO$_2$ | 36.34 | 1.46 | 53 | |
| 45 | TiO$_2$ | 119.84 | 2.52 | 302 | 5.8 |
| 46 | SiO$_2$ | 35.61 | 1.46 | 52 | |
| 47 | TiO$_2$ | 119.9 | 2.52 | 302 | 5.9 |
| 48 | SiO$_2$ | 35.31 | 1.46 | 52 | |
| 49 | TiO$_2$ | 119.89 | 2.52 | 302 | 5.8 |
| 50 | SiO$_2$ | 35.77 | 1.46 | 52 | |
| 51 | TiO$_2$ | 119.84 | 2.52 | 302 | 5.6 |
| 52 | SiO$_2$ | 36.79 | 1.46 | 54 | |
| 53 | TiO$_2$ | 119.78 | 2.52 | 302 | 5.5 |
| 54 | SiO$_2$ | 37.89 | 1.46 | 55 | |
| 55 | TiO$_2$ | 119.77 | 2.52 | 302 | 5.4 |
| 56 | SiO$_2$ | 38.59 | 1.46 | 56 | |
| 57 | TiO$_2$ | 119.98 | 2.52 | 302 | 5.4 |
| 58 | SiO$_2$ | 38.32 | 1.46 | 56 | |
| 59 | TiO$_2$ | 120.4 | 2.52 | 303 | 5.8 |
| 60 | SiO$_2$ | 36.08 | 1.46 | 53 | |

TABLE 3

| Number of layer | Material | Physical thickness [nm] | Refractive index $n_H$, or refractive index $n_L$ | Optical thickness $n_H d_H$, or optical thickness $n_L d_L$ [nm] | $n_H d_H / n_L d_L$ |
|---|---|---|---|---|---|
| 61 | TiO$_2$ | 102.32 | 2.52 | 258 | 17.3 |
| 62 | SiO$_2$ | 10.19 | 1.46 | 15 | |
| 63 | TiO$_2$ | 16.95 | 2.52 | 43 | 0.7 |
| 64 | SiO$_2$ | 39.58 | 1.46 | 58 | |
| 65 | TiO$_2$ | 98.49 | 2.52 | 248 | 10.0 |
| 66 | SiO$_2$ | 16.93 | 1.46 | 25 | |
| 67 | TiO$_2$ | 15.3 | 2.52 | 39 | 0.6 |
| 68 | SiO$_2$ | 46.58 | 1.46 | 68 | |
| 69 | TiO$_2$ | 114.45 | 2.52 | 288 | 5.3 |
| 70 | SiO$_2$ | 37.12 | 1.46 | 54 | |
| 71 | TiO$_2$ | 114.22 | 2.52 | 288 | 3.4 |
| 72 | SiO$_2$ | 58.17 | 1.46 | 85 | |
| 73 | TiO$_2$ | 19.73 | 2.52 | 50 | 1.4 |
| 74 | SiO$_2$ | 23.97 | 1.46 | 35 | |
| 75 | TiO$_2$ | 74.2 | 2.52 | 187 | 1.5 |
| 76 | SiO$_2$ | 83.11 | 1.46 | 121 | |

TABLE 4

| Number of layer | Material | Physical thickness [nm] | Refractive index $n_H$, or refractive index $n_L$ | Optical thickness $n_H d_H$, or optical thickness $n_L d_L$ [nm] | $n_H d_H / n_L d_L$ |
|---|---|---|---|---|---|
| 1 | TiO$_2$ | 8.19 | 2.52 | 20.64 | 0.23 |
| 2 | SiO$_2$ | 61.08 | 1.46 | 89.18 | |
| 3 | TiO$_2$ | 26.79 | 2.52 | 67.51 | 1.09 |
| 4 | SiO$_2$ | 42.36 | 1.46 | 61.85 | |
| 5 | TiO$_2$ | 38.65 | 2.52 | 97.40 | 1.36 |
| 6 | SiO$_2$ | 49.18 | 1.46 | 71.80 | |
| 7 | TiO$_2$ | 31.97 | 2.52 | 80.56 | 1.09 |
| 8 | SiO$_2$ | 50.54 | 1.46 | 73.79 | |

TABLE 4-continued

| Number of layer | Material | Physical thickness [nm] | Refractive index $n_H$, or refractive index $n_L$ | Optical thickness $n_H d_H$, or optical thickness $n_L d_L$ [nm] | $n_H d_H / n_L d_L$ |
|---|---|---|---|---|---|
| 9 | TiO$_2$ | 40.25 | 2.52 | 101.43 | 1.45 |
| 10 | SiO$_2$ | 47.77 | 1.46 | 69.74 | |
| 11 | TiO$_2$ | 30.47 | 2.52 | 76.78 | 0.81 |
| 12 | SiO$_2$ | 64.82 | 1.46 | 94.64 | |
| 13 | TiO$_2$ | 33.53 | 2.52 | 84.50 | 1.17 |
| 14 | SiO$_2$ | 49.45 | 1.46 | 72.20 | |
| 15 | TiO$_2$ | 32.7 | 2.52 | 82.40 | 0.86 |
| 16 | SiO$_2$ | 65.81 | 1.46 | 96.08 | |
| 17 | TiO$_2$ | 32.72 | 2.52 | 82.45 | 1.28 |
| 18 | SiO$_2$ | 44.15 | 1.46 | 64.46 | |
| 19 | TiO$_2$ | 39.66 | 2.52 | 99.94 | 1.12 |
| 20 | SiO$_2$ | 60.85 | 1.46 | 88.84 | |
| 21 | TiO$_2$ | 30.26 | 2.52 | 76.26 | 1.11 |
| 22 | SiO$_2$ | 46.94 | 1.46 | 68.53 | |
| 23 | TiO$_2$ | 41.32 | 2.52 | 104.13 | 1.11 |
| 24 | SiO$_2$ | 64.27 | 1.46 | 93.83 | |
| 25 | TiO$_2$ | 22.47 | 2.52 | 56.62 | 0.60 |
| 26 | SiO$_2$ | 64.87 | 1.46 | 94.71 | |
| 27 | TiO$_2$ | 35.1 | 2.52 | 88.45 | 0.91 |
| 28 | SiO$_2$ | 66.59 | 1.46 | 97.22 | |
| 29 | TiO$_2$ | 19.81 | 2.52 | 49.92 | 0.57 |
| 30 | SiO$_2$ | 60.18 | 1.46 | 87.86 | |

TABLE 5

| Number of layer | Material | Physical thickness [nm] | Refractive index $n_H$, or refractive index $n_L$ | Optical thickness $n_H d_H$, or optical thickness $n_L d_L$ [nm] | $n_H d_H / n_L d_L$ |
|---|---|---|---|---|---|
| 31 | TiO$_2$ | 56.34 | 2.52 | 141.98 | 2.79 |
| 32 | SiO$_2$ | 34.89 | 1.46 | 50.94 | |
| 33 | TiO$_2$ | 18.23 | 2.52 | 45.94 | 0.33 |
| 34 | SiO$_2$ | 94.15 | 1.46 | 137.46 | |
| 35 | TiO$_2$ | 94.32 | 2.52 | 237.69 | 1.16 |
| 36 | SiO$_2$ | 139.78 | 1.46 | 204.08 | |
| 37 | TiO$_2$ | 87.38 | 2.52 | 220.20 | 1.21 |
| 38 | SiO$_2$ | 125.06 | 1.46 | 182.59 | |
| 39 | TiO$_2$ | 14.11 | 2.52 | 35.56 | 2.07 |
| 40 | SiO$_2$ | 11.79 | 1.46 | 17.21 | |
| 41 | TiO$_2$ | 63.42 | 2.52 | 159.82 | 0.74 |
| 42 | SiO$_2$ | 147.56 | 1.46 | 215.44 | |
| 43 | TiO$_2$ | 81.33 | 2.52 | 204.95 | 0.99 |
| 44 | SiO$_2$ | 141.7 | 1.46 | 206.88 | |
| 45 | TiO$_2$ | 83.25 | 2.52 | 209.79 | 1.11 |
| 46 | SiO$_2$ | 129.58 | 1.46 | 189.19 | |
| 47 | TiO$_2$ | 10.49 | 2.52 | 26.43 | 1.88 |
| 48 | SiO$_2$ | 9.65 | 1.46 | 14.09 | |
| 49 | TiO$_2$ | 67.51 | 2.52 | 170.13 | 0.79 |
| 50 | SiO$_2$ | 146.77 | 1.46 | 214.28 | |
| 51 | TiO$_2$ | 80.15 | 2.52 | 201.98 | 0.96 |
| 52 | SiO$_2$ | 144.09 | 1.46 | 210.37 | |
| 53 | TiO$_2$ | 80.68 | 2.52 | 203.31 | 0.96 |
| 54 | SiO$_2$ | 144.43 | 1.46 | 210.87 | |
| 55 | TiO$_2$ | 81.01 | 2.52 | 204.15 | 0.96 |
| 56 | SiO$_2$ | 145.98 | 1.46 | 213.13 | |
| 57 | TiO$_2$ | 82 | 2.52 | 206.64 | 0.95 |
| 58 | SiO$_2$ | 149.22 | 1.46 | 217.86 | |
| 59 | TiO$_2$ | 84.9 | 2.52 | 213.95 | 0.92 |
| 60 | SiO$_2$ | 158.46 | 1.46 | 231.35 | |

TABLE 6

| Number of layer | Material | Physical thickness [nm] | Refractive index $n_H$, or refractive index $n_L$ | Optical thickness $n_H d_H$, or optical thickness $n_L d_L$ [nm] | $n_H d_H / n_L d_L$ |
|---|---|---|---|---|---|
| 61 | TiO$_2$ | 95.93 | 2.52 | 241.74 | 0.90 |
| 62 | SiO$_2$ | 184.26 | 1.46 | 269.02 | |

TABLE 6-continued

| Number of layer | Material | Physical thickness [nm] | Refractive index $n_H$, or refractive index $n_L$ | Optical thickness $n_H d_H$, or optical thickness $n_L d_L$ [nm] | $n_H d_H / n_L d_L$ |
|---|---|---|---|---|---|
| 63 | TiO$_2$ | 106 | 2.52 | 267.12 | 0.93 |
| 64 | SiO$_2$ | 196.64 | 1.46 | 287.09 | |
| 65 | TiO$_2$ | 18.19 | 2.52 | 45.84 | 1.06 |
| 66 | SiO$_2$ | 29.57 | 1.46 | 43.17 | |
| 67 | TiO$_2$ | 11.64 | 2.52 | 29.33 | 0.11 |
| 68 | SiO$_2$ | 185.67 | 1.46 | 271.08 | |
| 69 | TiO$_2$ | 108.57 | 2.52 | 273.60 | 0.96 |
| 70 | SiO$_2$ | 195.62 | 1.46 | 285.61 | |
| 71 | TiO$_2$ | 110.99 | 2.52 | 279.69 | 0.99 |
| 72 | SiO$_2$ | 194.44 | 1.46 | 283.88 | |
| 73 | TiO$_2$ | 114.99 | 2.52 | 289.77 | 2.86 |
| 74 | SiO$_2$ | 69.33 | 1.46 | 101.22 | |
| 75 | TiO$_2$ | 12.37 | 2.52 | 31.17 | 0.31 |
| 76 | SiO$_2$ | 69.35 | 1.46 | 101.25 | |
| 77 | TiO$_2$ | 113.99 | 2.52 | 287.25 | 1.03 |
| 78 | SiO$_2$ | 191.94 | 1.46 | 280.23 | |
| 79 | TiO$_2$ | 108.74 | 2.52 | 274.02 | 0.98 |
| 80 | SiO$_2$ | 190.65 | 1.46 | 278.35 | |
| 81 | TiO$_2$ | 112.71 | 2.52 | 284.03 | 2.81 |
| 82 | SiO$_2$ | 69.15 | 1.46 | 100.96 | |
| 83 | TiO$_2$ | 10.54 | 2.52 | 26.56 | 0.25 |
| 84 | SiO$_2$ | 72.2 | 1.46 | 105.41 | |
| 85 | TiO$_2$ | 105.81 | 2.52 | 266.64 | 1.05 |
| 86 | SiO$_2$ | 174.36 | 1.46 | 254.57 | |
| 87 | TiO$_2$ | 34.29 | 2.52 | 86.41 | 7.46 |
| 88 | SiO$_2$ | 7.93 | 1.46 | 11.58 | |
| 89 | TiO$_2$ | 46.08 | 2.52 | 116.12 | 0.92 |
| 90 | SiO$_2$ | 86.36 | 1.46 | 126.09 | |

Comparative Example 1

On one surface of a glass plate similar to the glass plate used in the example 1, each of TiO$_2$ layers and each of SiO$_2$ layers are alternately stacked, as presented in Tables 7 to 9, to form a dielectric multilayer for shielding infrared-wavelength region. Further, on the other surface of the glass plate, each of TiO$_2$ layers and each of SiO$_2$ layers are alternately stacked, as presented in Tables 4 to 6, in a similar manner to the second dielectric multilayer 4 in the optical member 1 of the example 1, to form a dielectric multilayer for shielding ultraviolet wavelength region and infrared-wavelength region, thereby manufacturing an optical member. Note that in the dielectric multilayer for shielding infrared-wavelength region presented in Tables 7 to 9, an optical thickness of each refractive index layer is basically set to $\lambda_0/4$. Here, $\lambda_0$ corresponds to a center wavelength 760 nm of a reflecting band.

TABLE 7

| Number of layer | Material | Physical thickness [nm] | Refractive index $n_H$, or refractive index $n_L$ | Optical thickness $n_H d_H$, or optical thickness $n_L d_L$ [nm] | $n_H d_H / n_L d_L$ |
|---|---|---|---|---|---|
| 1 | TiO$_2$ | 8.67 | 2.5 | 22 | 0.7 |
| 2 | SiO$_2$ | 21.88 | 1.46 | 32 | |
| 3 | TiO$_2$ | 87.36 | 2.5 | 218 | 1.0 |
| 4 | SiO$_2$ | 151.15 | 1.46 | 221 | |
| 5 | TiO$_2$ | 77.88 | 2.5 | 195 | 0.9 |
| 6 | SiO$_2$ | 141.8 | 1.46 | 207 | |
| 7 | TiO$_2$ | 74.87 | 2.5 | 187 | 0.9 |
| 8 | SiO$_2$ | 139.94 | 1.46 | 204 | |
| 9 | TiO$_2$ | 73.57 | 2.5 | 184 | 0.9 |
| 10 | SiO$_2$ | 139.34 | 1.46 | 203 | |
| 11 | TiO$_2$ | 72.65 | 2.5 | 182 | 0.9 |
| 12 | SiO$_2$ | 138.87 | 1.46 | 203 | |
| 13 | TiO$_2$ | 72.71 | 2.5 | 182 | 0.9 |
| 14 | SiO$_2$ | 138.12 | 1.46 | 202 | |

TABLE 7-continued

| Number of layer | Material | Physical thickness [nm] | Refractive index $n_H$, or refractive index $n_L$ | Optical thickness $n_H d_H$, or optical thickness $n_L d_L$ [nm] | $n_H d_H / n_L d_L$ |
|---|---|---|---|---|---|
| 15 | TiO₂ | 73.04 | 2.5 | 183 | 0.9 |
| 16 | SiO₂ | 136.86 | 1.46 | 200 | |
| 17 | TiO₂ | 73.73 | 2.5 | 184 | 0.9 |
| 18 | SiO₂ | 135.15 | 1.46 | 197 | |
| 19 | TiO₂ | 74.71 | 2.5 | 187 | 1.0 |
| 20 | SiO₂ | 133.24 | 1.46 | 195 | |
| 21 | TiO₂ | 75.82 | 2.5 | 190 | 1.0 |
| 22 | SiO₂ | 131.22 | 1.46 | 192 | |
| 23 | TiO₂ | 76.97 | 2.5 | 192 | 1.0 |
| 24 | SiO₂ | 129.06 | 1.46 | 188 | |
| 25 | TiO₂ | 78 | 2.5 | 195 | 1.1 |
| 26 | SiO₂ | 127.02 | 1.46 | 185 | |
| 27 | TiO₂ | 79.02 | 2.5 | 198 | 1.1 |
| 28 | SiO₂ | 125.65 | 1.46 | 183 | |
| 29 | TiO₂ | 79.85 | 2.5 | 200 | 1.1 |
| 30 | SiO₂ | 124.77 | 1.46 | 182 | |

TABLE 8

| Number of layer | Material | Physical thickness [nm] | Refractive index $n_H$, or refractive index $n_L$ | Optical thickness $n_H d_H$, or optical thickness $n_L d_L$ [nm] | $n_H d_H / n_L d_L$ |
|---|---|---|---|---|---|
| 31 | TiO₂ | 80.3 | 2.5 | 201 | 1.1 |
| 32 | SiO₂ | 124.18 | 1.46 | 181 | |
| 33 | TiO₂ | 80.36 | 2.5 | 201 | 1.1 |
| 34 | SiO₂ | 124.2 | 1.46 | 181 | |
| 35 | TiO₂ | 80.11 | 2.5 | 200 | 1.1 |
| 36 | SiO₂ | 125.01 | 1.46 | 183 | |
| 37 | TiO₂ | 79.52 | 2.5 | 199 | 1.1 |
| 38 | SiO₂ | 126.35 | 1.46 | 184 | |
| 39 | TiO₂ | 78.57 | 2.5 | 196 | 1.1 |
| 40 | SiO₂ | 128.05 | 1.46 | 187 | |
| 41 | TiO₂ | 77.43 | 2.5 | 194 | 1.0 |
| 42 | SiO₂ | 130.22 | 1.46 | 190 | |
| 43 | TiO₂ | 76.33 | 2.5 | 191 | 1.0 |
| 44 | SiO₂ | 132.37 | 1.46 | 193 | |
| 45 | TiO₂ | 75.22 | 2.5 | 188 | 1.0 |
| 46 | SiO₂ | 134.2 | 1.46 | 196 | |
| 47 | TiO₂ | 74.21 | 2.5 | 186 | 0.9 |
| 48 | SiO₂ | 135.74 | 1.46 | 198 | |
| 49 | TiO₂ | 73.62 | 2.5 | 184 | 0.9 |
| 50 | SiO₂ | 137.04 | 1.46 | 200 | |
| 51 | TiO₂ | 73.39 | 2.5 | 183 | 0.9 |
| 52 | SiO₂ | 137.77 | 1.46 | 201 | |
| 53 | TiO₂ | 73.25 | 2.5 | 183 | 0.9 |
| 54 | SiO₂ | 138.11 | 1.46 | 202 | |
| 55 | TiO₂ | 73.45 | 2.5 | 184 | 0.9 |
| 56 | SiO₂ | 138.49 | 1.46 | 202 | |
| 57 | TiO₂ | 74.25 | 2.5 | 186 | 0.9 |
| 58 | SiO₂ | 139.05 | 1.46 | 203 | |
| 59 | TiO₂ | 75.74 | 2.5 | 189 | 0.9 |
| 60 | SiO₂ | 140.75 | 1.46 | 205 | |

TABLE 9

| Number of layer | Material | Physical thickness [nm] | Refractive index $n_H$, or refractive index $n_L$ | Optical thickness $n_H d_H$, or optical thickness $n_L d_L$ [nm] | $n_H d_H / n_L d_L$ |
|---|---|---|---|---|---|
| 61 | TiO₂ | 78.33 | 2.5 | 196 | 0.9 |
| 62 | SiO₂ | 146.71 | 1.46 | 214 | |
| 63 | TiO₂ | 82.94 | 2.5 | 207 | 1.9 |
| 64 | SiO₂ | 73.68 | 1.46 | 108 | |

Comparative Example 2

On one surface of a glass plate similar to the glass plate used in the example 1, each of TiO₂ layers and each of SiO₂ layers are alternately stacked, as presented in Tables 10 to 12, to form a dielectric multilayer for shielding infrared-wavelength region. Further, on the other surface of the glass plate, each of TiO₂ layers and each of SiO₂ layers are alternately stacked, as presented in Tables 4 to 6, in a similar manner to the second dielectric multilayer 4 in the optical member 1 of the example 1, to form a dielectric multilayer for shielding ultraviolet wavelength region and infrared-wavelength region, thereby manufacturing an optical member. Note that in the dielectric multilayer for shielding infrared-wavelength region presented in Tables 10 to 12, an optical thickness of each refractive index layer is basically set to $5\lambda_0/4$. Here, $\lambda_0$ corresponds to a center wavelength 680 nm of a reflecting band.

TABLE 10

| Number of layer | Material | Physical thickness [nm] | Refractive index $n_H$, or refractive index $n_L$ | Optical thickness $n_H d_H$, or optical thickness $n_L d_L$ [nm] | $n_H d_H / n_L d_L$ |
|---|---|---|---|---|---|
| 1 | TiO₂ | 12.39 | 2.5 | 31 | 0.7 |
| 2 | SiO₂ | 28.34 | 1.46 | 41 | |
| 3 | TiO₂ | 354.07 | 2.5 | 885 | 1.0 |
| 4 | SiO₂ | 602.76 | 1.46 | 880 | |
| 5 | TiO₂ | 343.02 | 2.5 | 858 | 1.0 |
| 6 | SiO₂ | 589.81 | 1.46 | 861 | |
| 7 | TiO₂ | 339.52 | 2.5 | 849 | 1.0 |
| 8 | SiO₂ | 586.89 | 1.46 | 857 | |
| 9 | TiO₂ | 338.11 | 2.5 | 845 | 1.0 |
| 10 | SiO₂ | 586.02 | 1.46 | 856 | |
| 11 | TiO₂ | 337.47 | 2.5 | 844 | 1.0 |
| 12 | SiO₂ | 585.18 | 1.46 | 854 | |
| 13 | TiO₂ | 337.36 | 2.5 | 843 | 1.0 |
| 14 | SiO₂ | 584.49 | 1.46 | 853 | |
| 15 | TiO₂ | 337.44 | 2.5 | 844 | 1.0 |
| 16 | SiO₂ | 583.46 | 1.46 | 852 | |
| 17 | TiO₂ | 337.87 | 2.5 | 845 | 1.0 |
| 18 | SiO₂ | 582.17 | 1.46 | 850 | |
| 19 | TiO₂ | 338.75 | 2.5 | 847 | 1.0 |
| 20 | SiO₂ | 580.48 | 1.46 | 848 | |
| 21 | TiO₂ | 339.6 | 2.5 | 849 | 1.0 |
| 22 | SiO₂ | 578.74 | 1.46 | 845 | |
| 23 | TiO₂ | 340.71 | 2.5 | 852 | 1.0 |
| 24 | SiO₂ | 576.86 | 1.46 | 842 | |
| 25 | TiO₂ | 341.79 | 2.5 | 854 | 1.0 |
| 26 | SiO₂ | 575.08 | 1.46 | 840 | |
| 27 | TiO₂ | 342.65 | 2.5 | 857 | 1.0 |
| 28 | SiO₂ | 573.49 | 1.46 | 837 | |
| 29 | TiO₂ | 343.46 | 2.5 | 859 | 1.0 |
| 30 | SiO₂ | 572.34 | 1.46 | 836 | |

TABLE 11

| Number of layer | Material | Physical thickness [nm] | Refractive index $n_H$, or refractive index $n_L$ | Optical thickness $n_H d_H$, or optical thickness $n_L d_L$ [nm] | $n_H d_H / n_L d_L$ |
|---|---|---|---|---|---|
| 31 | TiO₂ | 344.04 | 2.5 | 860 | 1.0 |
| 32 | SiO₂ | 571.59 | 1.46 | 835 | |
| 33 | TiO₂ | 344.45 | 2.5 | 861 | 1.0 |
| 34 | SiO₂ | 571.21 | 1.46 | 834 | |
| 35 | TiO₂ | 344.64 | 2.5 | 862 | 1.0 |
| 36 | SiO₂ | 570.88 | 1.46 | 833 | |
| 37 | TiO₂ | 344.63 | 2.5 | 862 | 1.0 |
| 38 | SiO₂ | 571.33 | 1.46 | 834 | |
| 39 | TiO₂ | 344.52 | 2.5 | 861 | 1.0 |
| 40 | SiO₂ | 572.17 | 1.46 | 835 | |
| 41 | TiO₂ | 344.21 | 2.5 | 861 | 1.0 |

TABLE 11-continued

| Number of layer | Material | Physical thickness [nm] | Refractive index $n_H$, or refractive index $n_L$ | Optical thickness $n_H d_H$, or optical thickness $n_L d_L$ [nm] | $n_H d_H / n_L d_L$ |
|---|---|---|---|---|---|
| 42 | SiO$_2$ | 573.05 | 1.46 | 837 | |
| 43 | TiO$_2$ | 343.84 | 2.5 | 860 | 1.0 |
| 44 | SiO$_2$ | 574.39 | 1.46 | 839 | |
| 45 | TiO$_2$ | 343.35 | 2.5 | 858 | 1.0 |
| 46 | SiO$_2$ | 575.69 | 1.46 | 841 | |
| 47 | TiO$_2$ | 342.97 | 2.5 | 857 | 1.0 |
| 48 | SiO$_2$ | 577.37 | 1.46 | 843 | |
| 49 | TiO$_2$ | 342.71 | 2.5 | 857 | 1.0 |
| 50 | SiO$_2$ | 579.24 | 1.46 | 846 | |
| 51 | TiO$_2$ | 342.75 | 2.5 | 857 | 1.0 |
| 52 | SiO$_2$ | 581.29 | 1.46 | 849 | |
| 53 | TiO$_2$ | 343.2 | 2.5 | 858 | 1.0 |
| 54 | SiO$_2$ | 583.8 | 1.46 | 852 | |
| 55 | TiO$_2$ | 344.27 | 2.5 | 861 | 1.0 |
| 56 | SiO$_2$ | 586.63 | 1.46 | 856 | |
| 57 | TiO$_2$ | 346 | 2.5 | 865 | 1.0 |
| 58 | SiO$_2$ | 590.23 | 1.46 | 862 | |
| 59 | TiO$_2$ | 348.5 | 2.5 | 871 | 1.0 |
| 60 | SiO$_2$ | 595.61 | 1.46 | 870 | |

TABLE 12

| Number of layer | Material | Physical thickness [nm] | Refractive index $n_H$, or refractive index $n_L$ | Optical thickness $n_H d_H$, or optical thickness $n_L d_L$ [nm] | $n_H d_H / n_L d_L$ |
|---|---|---|---|---|---|
| 61 | TiO$_2$ | 354.79 | 2.5 | 887 | 1.2 |
| 62 | SiO$_2$ | 510.49 | 1.46 | 745 | |

Figure 4:
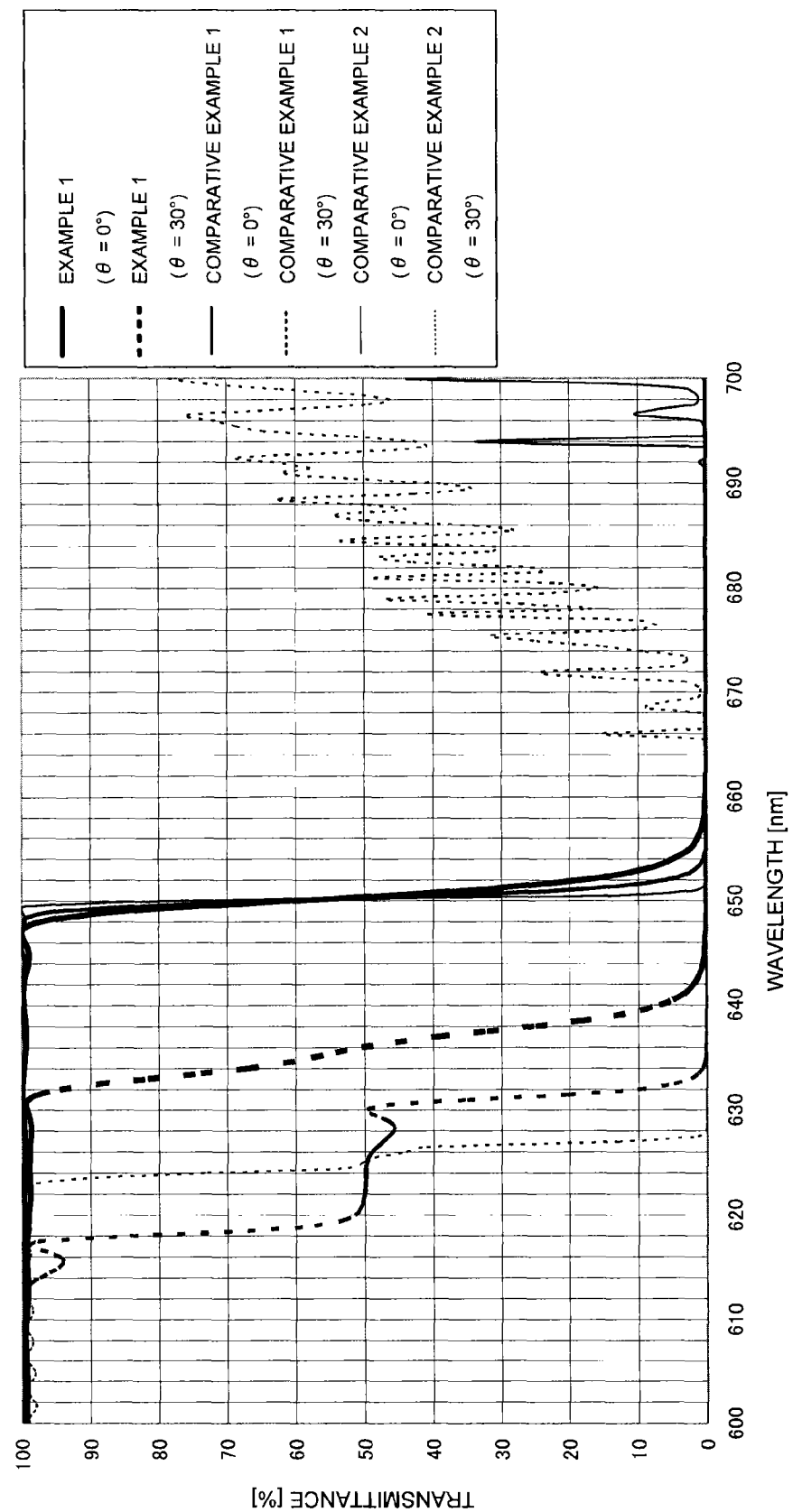
FIG. 4 is a diagram illustrating spectral transmittances of optical members of an example 1, and comparative examples 1 and 2.
Figure 5:
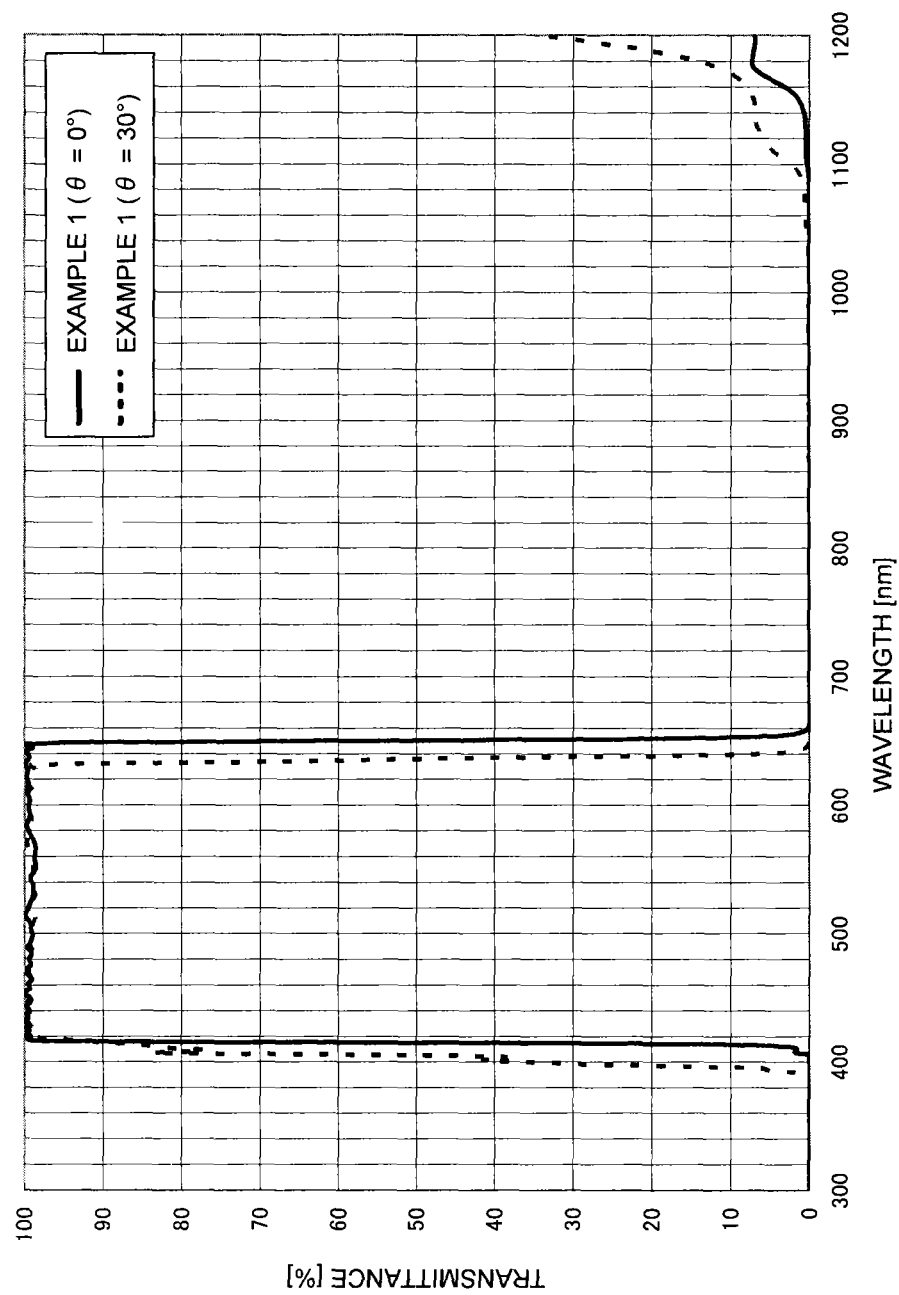
FIG. 5 is a diagram illustrating the spectral transmittance of the optical member of the example 1.

Next, regarding the optical members of the example 1, and the comparative examples 1 and 2, an optical simulation was conducted to determine a spectral transmittance at an incident angle θ of 0°, and a spectral transmittance at an incident angle θ of 30°. FIG. 4 illustrates the spectral transmittance at the incident angle θ of 0°, and the spectral transmittance at the incident angle θ of 30° in a wavelength range of 600 to 700 nm, regarding each of the optical members of the example 1, and the comparative examples 1 and 2. Further, FIG. 5 illustrates the spectral transmittance at the incident angle θ of 0°, and the spectral transmittance at the incident angle θ of 30° in a wavelength range of 300 to 1200 nm, regarding the optical member of the example 1. Note that in the optical simulation, a refractive index of the high-refractive index layer takes a wavelength dependence into consideration.

As is also apparent from FIG. 4, regarding the optical member 1 of the example 1, a difference between a 50% transmission wavelength at the incident angle θ of 0° and a 50% transmission wavelength at the incident angle θ of 30° in a cut-off band in the vicinity of 650 nm, can be 16 nm. Therefore, the incident angle dependence can be effectively reduced. Note that, regarding the optical member 1 of the example 1, the number of the unit refractive index layers 33 in the first dielectric multilayer 3 satisfying the condition of $n_H d_H / n_L d_L \geq 3$, preferably $n_H d_H / n_L d_L \geq 5$ is 10 or more, concretely, the number of layers satisfying the condition of $n_H d_H / n_L d_L \geq 3$ is 28, and the number of layers satisfying the condition of $n_H d_H / n_L d_L \geq 5$ is 25. Further, as is apparent from FIG. 5, regarding the optical member 1 of the example 1, the incident angle dependence can be effectively reduced, and a transmittance ripple, namely, a flatness of spectral transmittance can also be effectively improved.

Example 2

On one surface of a soda glass plate with a thickness of 1 mm as a transparent substrate 2, each of TiO$_2$ layers as high-refractive index layers 31 and each of SiO$_2$ layers as low-refractive index layers 32 are alternately stacked, as presented in Table 13, to form a first dielectric multilayer 3, thereby manufacturing an optical member 1.

Note that regarding the first dielectric multilayer 3, it is set that a total number of layers as a result of combining the high-refractive index layers 31 and the low-refractive index layers 32 is 30, namely, a total number of unit refractive index layers 33 is 15. In the first dielectric multilayer 3, a number of the unit refractive index layers 33 satisfying a condition of $n_H d_H / n_L d_L \geq 3$ is 13, a number of the unit refractive index layers 33 satisfying a condition of $n_H d_H / n_L d_L \geq 5$ is 12, and a number of the unit refractive index layers 33 satisfying a condition of $5 \leq n_H d_H / n_L d_L \leq 8$ is 12. An average $n_H d_H / n_L d_L$ is 5.5, an average optical thickness $n_H d_H$ is 283 nm, and an average optical thickness $n_L d_L$ is 48 nm.

Further, at an incident angle θ of 0°, the optical member 1 of the example 2 has a transmittance in a range of 360 to 395 nm of less than 3%, an average transmittance in a range of 430 to 630 nm of 95% or more, a minimum transmittance in the range of 430 to 630 nm of 90% or more, and has points where the transmittance indicates 50%, within a range of 415±10 nm, and within a range of 650±6 nm.

TABLE 13

| Number of layer | Material | Physical thickness [nm] | Refractive index $n_H$, or refractive index $n_L$ | Optical thickness $n_H d_H$, or optical thickness $n_L d_L$ [nm] | $n_H d_H / n_L d_L$ |
|---|---|---|---|---|---|
| 1 | TiO$_2$ | 6.92 | 2.52 | 17.44 | 0.3 |
| 2 | SiO$_2$ | 37.85 | 1.46 | 55.26 | |
| 3 | TiO$_2$ | 114.77 | 2.52 | 289.22 | 7.8 |
| 4 | SiO$_2$ | 25.4 | 1.46 | 37.08 | |
| 5 | TiO$_2$ | 126.41 | 2.52 | 318.55 | 7.5 |
| 6 | SiO$_2$ | 28.98 | 1.46 | 42.31 | |
| 7 | TiO$_2$ | 124.77 | 2.52 | 314.42 | 6.5 |
| 8 | SiO$_2$ | 33.17 | 1.46 | 48.43 | |
| 9 | TiO$_2$ | 122.56 | 2.52 | 308.85 | 5.7 |
| 10 | SiO$_2$ | 36.87 | 1.46 | 53.83 | |
| 11 | TiO$_2$ | 120.83 | 2.52 | 304.49 | 5.3 |
| 12 | SiO$_2$ | 39.62 | 1.46 | 57.85 | |
| 13 | TiO$_2$ | 119.64 | 2.52 | 301.49 | 5.0 |
| 14 | SiO$_2$ | 41.1 | 1.46 | 60.01 | |
| 15 | TiO$_2$ | 119.01 | 2.52 | 299.91 | 4.9 |
| 16 | SiO$_2$ | 41.51 | 1.46 | 60.60 | |
| 17 | TiO$_2$ | 118.95 | 2.52 | 299.75 | 5.0 |
| 18 | SiO$_2$ | 41.19 | 1.46 | 60.14 | |
| 19 | TiO$_2$ | 119.48 | 2.52 | 301.09 | 5.2 |
| 20 | SiO$_2$ | 39.86 | 1.46 | 58.20 | |
| 21 | TiO$_2$ | 120.52 | 2.52 | 303.71 | 5.6 |
| 22 | SiO$_2$ | 37.23 | 1.46 | 54.36 | |
| 23 | TiO$_2$ | 121.99 | 2.52 | 307.41 | 6.3 |
| 24 | SiO$_2$ | 33.62 | 1.46 | 49.09 | |
| 25 | TiO$_2$ | 123.59 | 2.52 | 311.45 | 7.2 |
| 26 | SiO$_2$ | 29.74 | 1.46 | 43.42 | |
| 27 | TiO$_2$ | 123.5 | 2.52 | 311.22 | 8.0 |
| 28 | SiO$_2$ | 26.54 | 1.46 | 38.75 | |
| 29 | TiO$_2$ | 103.53 | 2.52 | 260.90 | 2.5 |
| 30 | SiO$_2$ | 71.78 | 1.46 | 104.80 | |

Figure 6:
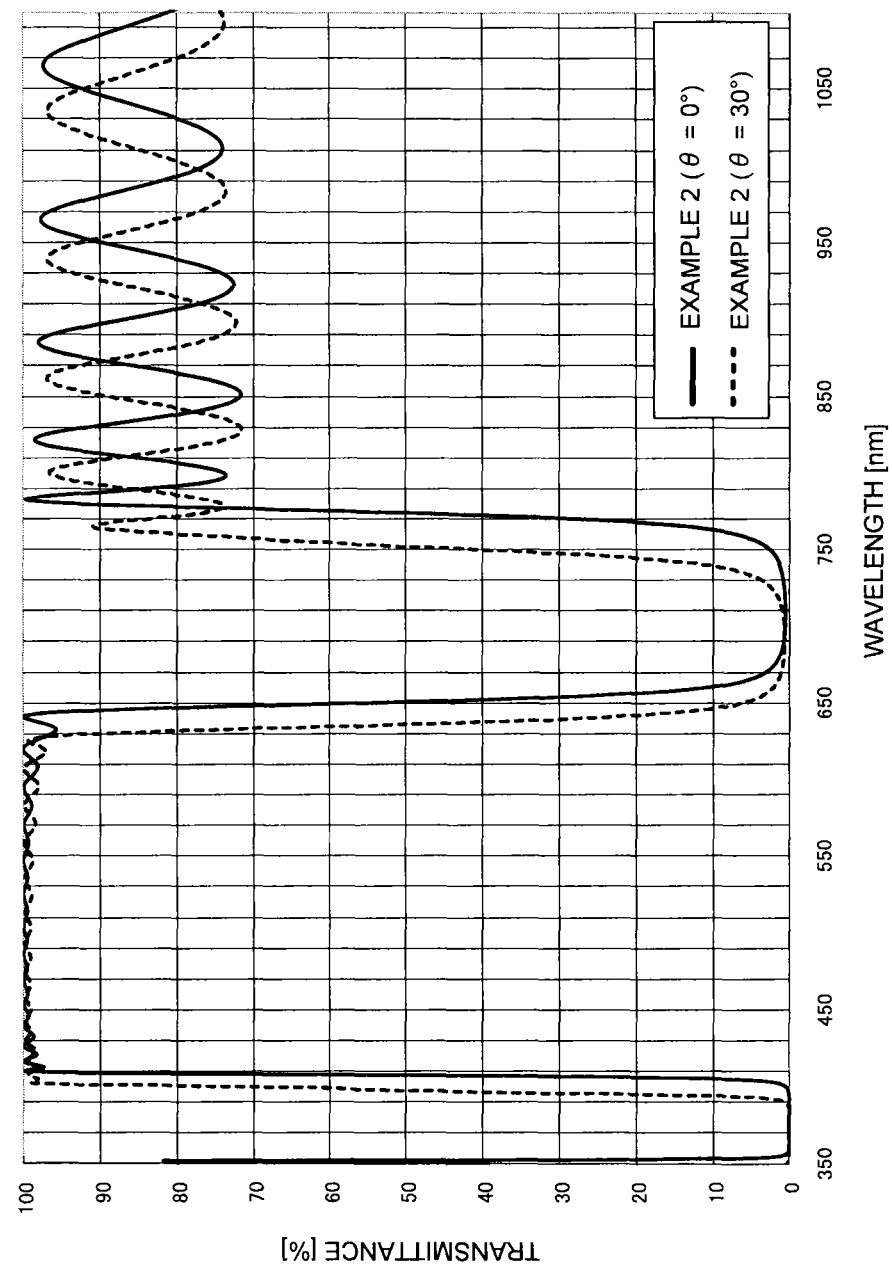
FIG. 6 is a diagram illustrating a spectral transmittance of an optical member of an example 2.

Next, regarding the optical member 1 of the example 2, an optical simulation was conducted to determine a spectral transmittance at the incident angle θ of 0°, and a spectral transmittance at an incident angle θ of 30°. FIG. 6 illustrates the spectral transmittance at the incident angle θ of 0°, and the spectral transmittance at the incident angle θ of 30° in a wavelength range of 350 to 1100 nm. Note that in the optical simulation, a refractive index of the high-refractive index layer takes a wavelength dependence into consideration.

As is also apparent from FIG. 6, in the optical member 1 of the example 2, a difference between a 50% transmission wavelength at the incident angle θ of 0° and a 50% transmission wavelength at the incident angle θ of 30° in a cut-off band in the vicinity of 650 nm, can be 16 nm. Thus, the incident angle dependence can be effectively reduced. Note that, regarding the optical member 1 of the example 2, the number of the unit refractive index layers 33 in the first dielectric multilayer 3 satisfying the condition of $n_H d_H / n_L d_L \geq 3$ is 13, and the number of the unit refractive index layers 33 in the first dielectric multilayer 3 satisfying the condition of $n_H d_H / n_L d_L \geq 5$ is 12.

Example 3

On one surface of a near-infrared cut filter glass (NF-50 glass manufactured by ASAHI GLASS CO., LTD., with a glass thickness of 0.3 mm) as a transparent substrate 2, each of $TiO_2$ layers as high-refractive index layers 31 and each of $SiO_2$ layers as low-refractive index layers 32 are alternately stacked, as presented in Tables 14 to 16, to form a first dielectric multilayer 3. Further, on the other surface of the transparent substrate 2, each of $TiO_2$ layers as high-refractive index layers 41 and each of $SiO_2$ layers as low-refractive index layers 42 are alternately stacked, as presented in Table 17, to form a second dielectric multilayer 4, thereby manufacturing an optical member 1.

Note that regarding the first dielectric multilayer 3, it is set that a total number of layers as a result of combining the high-refractive index layers 31 and the low-refractive index layers 32 is 76, namely, a total number of unit refractive index layers 33 is 38. In the first dielectric multilayer 3, a number of the unit refractive index layers 33 satisfying a condition of $n_H d_H / n_L d_L \geq 3$ is 28, a number of the unit refractive index layers 33 satisfying a condition of $n_H d_H / n_L d_L \geq 5$ is 20, and a number of the unit refractive index layers 33 satisfying a condition of $5 \leq n_H d_H / n_L d_L \leq 8$ is 17. An average $n_H d_H / n_L d_L$ is 5.1, an average optical thickness $n_H d_H$ is 247 nm, and an average optical thickness $n_L d_L$ is 58 nm.

Regarding the second dielectric multilayer 4, it is set that a total number of layers as a result of combining the high-refractive index layers 41 and the low-refractive index layers 42 is 12, namely, a total number of unit refractive index layers 43 is 6, an average $n_H d_H / n_L d_L$ is 1.1, an average optical thickness $n_H d_H$ is 211 nm, and an average optical thickness $n_L d_L$ is 190 nm.

Further, at an incident angle θ of 0°, the optical member 1 of the example 3 satisfies conditions that a transmittance in a range of 350 to 395 nm is less than 3%, an average transmittance in a range of 430 to 545 nm is 95% or more, a minimum transmittance in the range of 430 to 545 nm is 90% or more, an average transmittance in a range of 700 to 1000 nm is less than 0.1%, a maximum transmittance in the range of 700 to 1000 nm is less than 0.5%, an average transmittance in a range of 1000 to 1100 nm is less than 0.5%, and a maximum transmittance in the range of 1000 to 1100 nm is less than 2%, and it has points where the transmittance indicates 50%, within a range of 415±10 nm, and within a range of 640±6 nm.

TABLE 14

| Number of layer | Material | Physical thickness [nm] | Refractive index $n_H$, or refractive index $n_L$ | Optical thickness $n_H d_H$, or optical thickness $n_L d_L$ [nm] | $n_H d_H / n_L d_L$ |
|---|---|---|---|---|---|
| 1 | $TiO_2$ | 14 | 2.52 | 34.75 | 0.9 |
| 2 | $SiO_2$ | 27 | 1.46 | 39.01 | |
| 3 | $TiO_2$ | 84 | 2.52 | 212.41 | 3.9 |

TABLE 14-continued

| Number of layer | Material | Physical thickness [nm] | Refractive index $n_H$, or refractive index $n_L$ | Optical thickness $n_H d_H$, or optical thickness $n_L d_L$ [nm] | $n_H d_H / n_L d_L$ |
|---|---|---|---|---|---|
| 4 | $SiO_2$ | 37 | 1.46 | 53.86 | |
| 5 | $TiO_2$ | 18 | 2.52 | 45.23 | 0.5 |
| 6 | $SiO_2$ | 63 | 1.46 | 91.94 | |
| 7 | $TiO_2$ | 89 | 2.52 | 223.37 | 12.7 |
| 8 | $SiO_2$ | 12 | 1.46 | 17.64 | |
| 9 | $TiO_2$ | 18 | 2.52 | 46.37 | 0.6 |
| 10 | $SiO_2$ | 54 | 1.46 | 78.53 | |
| 11 | $TiO_2$ | 8 | 2.52 | 20.69 | 0.5 |
| 12 | $SiO_2$ | 29 | 1.46 | 42.30 | |
| 13 | $TiO_2$ | 114 | 2.52 | 288.36 | 5.3 |
| 14 | $SiO_2$ | 37 | 1.46 | 54.41 | |
| 15 | $TiO_2$ | 126 | 2.52 | 318.33 | 5.9 |
| 16 | $SiO_2$ | 37 | 1.46 | 54.25 | |
| 17 | $TiO_2$ | 14 | 2.52 | 34.83 | 2.4 |
| 18 | $SiO_2$ | 10 | 1.46 | 14.79 | |
| 19 | $TiO_2$ | 117 | 2.52 | 295.92 | 5.4 |
| 20 | $SiO_2$ | 37 | 1.46 | 54.34 | |
| 21 | $TiO_2$ | 130 | 2.52 | 328.38 | 6.0 |
| 22 | $SiO_2$ | 37 | 1.46 | 54.43 | |
| 23 | $TiO_2$ | 133 | 2.52 | 334.58 | 6.3 |
| 24 | $SiO_2$ | 37 | 1.46 | 53.49 | |
| 25 | $TiO_2$ | 133 | 2.52 | 334.58 | 6.4 |
| 26 | $SiO_2$ | 36 | 1.46 | 52.33 | |
| 27 | $TiO_2$ | 133 | 2.52 | 335.46 | 6.4 |
| 28 | $SiO_2$ | 36 | 1.46 | 52.05 | |
| 29 | $TiO_2$ | 134 | 2.52 | 336.42 | 6.4 |
| 30 | $SiO_2$ | 36 | 1.46 | 52.55 | |

TABLE 15

| Number of layer | Material | Physical thickness [nm] | Refractive index $n_H$, or refractive index $n_L$ | Optical thickness $n_H d_H$, or optical thickness $n_L d_L$ [nm] | $n_H d_H / n_L d_L$ |
|---|---|---|---|---|---|
| 31 | $TiO_2$ | 133 | 2.52 | 335.87 | 6.2 |
| 32 | $SiO_2$ | 37 | 1.46 | 54.41 | |
| 33 | $TiO_2$ | 132 | 2.52 | 331.38 | 5.8 |
| 34 | $SiO_2$ | 39 | 1.46 | 56.93 | |
| 35 | $TiO_2$ | 130 | 2.52 | 326.87 | 5.4 |
| 36 | $SiO_2$ | 42 | 1.46 | 60.81 | |
| 37 | $TiO_2$ | 127 | 2.52 | 320.77 | 4.9 |
| 38 | $SiO_2$ | 45 | 1.46 | 65.73 | |
| 39 | $TiO_2$ | 126 | 2.52 | 317.34 | 4.7 |
| 40 | $SiO_2$ | 47 | 1.46 | 68.08 | |
| 41 | $TiO_2$ | 124 | 2.52 | 312.63 | 4.5 |
| 42 | $SiO_2$ | 47 | 1.46 | 69.20 | |
| 43 | $TiO_2$ | 123 | 2.52 | 310.87 | 4.4 |
| 44 | $SiO_2$ | 48 | 1.46 | 70.63 | |
| 45 | $TiO_2$ | 123 | 2.52 | 310.26 | 4.5 |
| 46 | $SiO_2$ | 48 | 1.46 | 69.47 | |
| 47 | $TiO_2$ | 123 | 2.52 | 308.90 | 4.8 |
| 48 | $SiO_2$ | 44 | 1.46 | 64.69 | |
| 49 | $TiO_2$ | 124 | 2.52 | 313.29 | 5.1 |
| 50 | $SiO_2$ | 42 | 1.46 | 61.01 | |
| 51 | $TiO_2$ | 124 | 2.52 | 312.05 | 5.4 |
| 52 | $SiO_2$ | 39 | 1.46 | 57.32 | |
| 53 | $TiO_2$ | 125 | 2.52 | 314.55 | 5.5 |
| 54 | $SiO_2$ | 39 | 1.46 | 56.84 | |
| 55 | $TiO_2$ | 123 | 2.52 | 310.89 | 5.2 |
| 56 | $SiO_2$ | 41 | 1.46 | 60.09 | |
| 57 | $TiO_2$ | 124 | 2.52 | 312.30 | 5.1 |
| 58 | $SiO_2$ | 42 | 1.46 | 61.79 | |
| 59 | $TiO_2$ | 125 | 2.52 | 313.74 | 5.0 |
| 60 | $SiO_2$ | 43 | 1.46 | 62.34 | |

TABLE 16

| Number of layer | Material | Physical thickness [nm] | Refractive index $n_H$, or refractive index $n_L$ | Optical thickness $n_H d_H$, or optical thickness $n_L d_L$ [nm] | $n_H d_H / n_L d_L$ |
|---|---|---|---|---|---|
| 61 | TiO$_2$ | 114 | 2.52 | 288.21 | 19.8 |
| 62 | SiO$_2$ | 10 | 1.46 | 14.56 | |
| 63 | TiO$_2$ | 10 | 2.52 | 24.29 | 0.4 |
| 64 | SiO$_2$ | 40 | 1.46 | 58.06 | |
| 65 | TiO$_2$ | 110 | 2.52 | 276.82 | 15.6 |
| 66 | SiO$_2$ | 12 | 1.46 | 17.77 | |
| 67 | TiO$_2$ | 11 | 2.52 | 28.83 | 0.5 |
| 68 | SiO$_2$ | 43 | 1.46 | 62.20 | |
| 69 | TiO$_2$ | 121 | 2.52 | 303.74 | 4.9 |
| 70 | SiO$_2$ | 42 | 1.46 | 61.54 | |
| 71 | TiO$_2$ | 115 | 2.52 | 290.30 | 2.7 |
| 72 | SiO$_2$ | 75 | 1.46 | 108.97 | |
| 73 | TiO$_2$ | 16 | 2.52 | 40.24 | 1.0 |
| 74 | SiO$_2$ | 28 | 1.46 | 41.13 | |
| 75 | TiO$_2$ | 76 | 2.52 | 191.85 | 1.7 |
| 76 | SiO$_2$ | 78 | 1.46 | 113.92 | |

TABLE 17

| Number of layer | Material | Physical thickness [nm] | Refractive index $n_H$, or refractive index $n_L$ | Optical thickness $n_H d_H$, or optical thickness $n_L d_L$ [nm] | $n_H d_H / n_L d_L$ |
|---|---|---|---|---|---|
| 1 | TiO$_2$ | 11 | 2.52 | 26.89 | 0.5 |
| 2 | SiO$_2$ | 36 | 1.46 | 52.69 | |
| 3 | TiO$_2$ | 107 | 2.52 | 269.26 | 1.1 |
| 4 | SiO$_2$ | 171 | 1.46 | 249.30 | |
| 5 | TiO$_2$ | 98 | 2.52 | 246.36 | 1.0 |
| 6 | SiO$_2$ | 162 | 1.46 | 236.58 | |
| 7 | TiO$_2$ | 93 | 2.52 | 234.64 | 1.0 |
| 8 | SiO$_2$ | 162 | 1.46 | 236.72 | |
| 9 | TiO$_2$ | 97 | 2.52 | 243.26 | 1.0 |
| 10 | SiO$_2$ | 167 | 1.46 | 243.21 | |
| 11 | TiO$_2$ | 98 | 2.52 | 247.59 | 2.0 |
| 12 | SiO$_2$ | 85 | 1.46 | 124.04 | |

Figure 7:
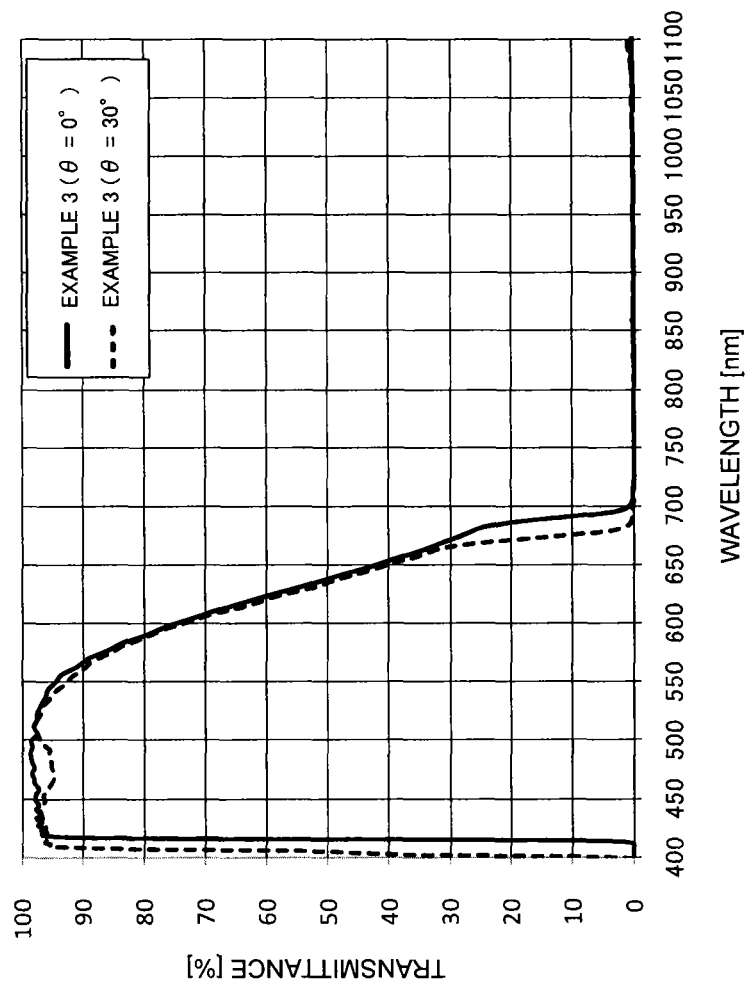
FIG. 7 is a diagram illustrating a spectral transmittance of an optical member of an example 3.

Next, regarding the optical member 1 of the example 3, an optical simulation was conducted to determine a spectral transmittance at the incident angle θ of 0°, and a spectral transmittance at an incident angle θ of 30°. FIG. 7 illustrates the spectral transmittance at the incident angle θ of 0°, and the spectral transmittance at the incident angle θ of 30° in a wavelength range of 400 to 1100 nm. Note that in the optical simulation, a refractive index of each refractive index layer does not take a wavelength dependence into consideration.

As is also apparent from FIG. 7, regarding the optical member 1 of the example 3, a 50% transmission wavelength can be 635 nm at the incident angle θ of 30°, while a 50% transmission wavelength is 638 nm at the incident angle θ of 0° in a cut-off band. A 20% transmission wavelength can be 671 nm at the incident angle θ of 30°, while a 20% transmission wavelength is 686 nm at the incident angle θ of 0° in a cut-off band. Therefore, the incident angle dependence can be effectively reduced. Note that, in the optical member 1 of the example 3, a near-infrared cut filter glass is used as the transparent substrate 2.

Comparative Example 3

On one surface of a glass plate similar to the glass plate used in the example 1, mainly each of TiO$_2$ layers and each of Al$_2$O$_3$ layers are alternately stacked, as presented in Tables 18 and 19, to form a dielectric multilayer for shielding infrared-wavelength region. Note that layers described in the numbers of layers 1, 2, and 35 correspond to adjustment layers, and layers indicated by the numbers of layers 3 to 34 corresponds to the dielectric multilayer for shielding infrared-wavelength region. Further, on the other surface of the glass plate, each of TiO$_2$ layers and each of SiO$_2$ layers are alternately stacked, as presented in Tables 4 to 6, in a similar manner to the second dielectric multilayer 4 in the optical member 1 of the example 1, to form a dielectric multilayer for shielding ultraviolet wavelength region and infrared-wavelength region, thereby manufacturing an optical member. Note that the dielectric multilayer for shielding infrared-wavelength region presented in Tables 18 and 19 has a repeating structure of high-refractive index layers and medium-refractive index layers (formed of a composing material having a refractive index of more than 1.6 and less than 2).

TABLE 18

| Number of layer | Material | Physical thickness [nm] | Refractive index $n_H$, or refractive index $n_L$ | Optical thickness $n_H d_H$, or optical thickness $n_L d_L$ [nm] | $n_H d_H / n_L d_L$ |
|---|---|---|---|---|---|
| 1 | TiO$_2$ | 6.35 | 2.50 | 15.88 | |
| 2 | SiO$_2$ | 56.41 | 1.46 | 82.36 | |
| 3 | TiO$_2$ | 11.97 | 2.50 | 29.93 | 0.1 |
| 4 | Al$_2$O$_3$ | 186.35 | 1.63 | 303.75 | |
| 5 | TiO$_2$ | 92.05 | 2.50 | 230.13 | 1.2 |
| 6 | Al$_2$O$_3$ | 120.65 | 1.63 | 196.66 | |
| 7 | TiO$_2$ | 83.35 | 2.50 | 208.38 | 1.2 |
| 8 | Al$_2$O$_3$ | 109.85 | 1.63 | 179.06 | |
| 9 | TiO$_2$ | 85 | 2.50 | 212.50 | 1.3 |
| 10 | Al$_2$O$_3$ | 100.02 | 1.63 | 163.03 | |
| 11 | TiO$_2$ | 89.26 | 2.50 | 223.15 | 1.5 |
| 12 | Al$_2$O$_3$ | 89.21 | 1.63 | 145.41 | |
| 13 | TiO$_2$ | 94.69 | 2.50 | 236.73 | 1.9 |
| 14 | Al$_2$O$_3$ | 76.01 | 1.63 | 123.90 | |
| 15 | TiO$_2$ | 94.62 | 2.50 | 236.55 | 1.7 |
| 16 | Al$_2$O$_3$ | 87.69 | 1.63 | 142.93 | |
| 17 | TiO$_2$ | 87.22 | 2.50 | 218.05 | 1.3 |
| 18 | Al$_2$O$_3$ | 102.87 | 1.63 | 167.68 | |
| 19 | TiO$_2$ | 77.55 | 2.50 | 193.88 | 1.0 |
| 20 | Al$_2$O$_3$ | 119.38 | 1.63 | 194.59 | |
| 21 | TiO$_2$ | 66.24 | 2.50 | 165.60 | 0.7 |
| 22 | Al$_2$O$_3$ | 140.08 | 1.63 | 228.33 | |
| 23 | TiO$_2$ | 45.02 | 2.50 | 112.55 | 0.5 |
| 24 | Al$_2$O$_3$ | 149.55 | 1.63 | 243.77 | |
| 25 | TiO$_2$ | 51.38 | 2.50 | 128.45 | 0.6 |
| 26 | Al$_2$O$_3$ | 138.13 | 1.63 | 225.15 | |
| 27 | TiO$_2$ | 64.74 | 2.50 | 161.85 | 0.8 |
| 28 | Al$_2$O$_3$ | 124.47 | 1.63 | 202.89 | |
| 29 | TiO$_2$ | 73.13 | 2.50 | 182.83 | 1.0 |
| 30 | Al$_2$O$_3$ | 116.28 | 1.63 | 189.54 | |

TABLE 19

| Number of layer | Material | Physical thickness [nm] | Refractive index $n_H$, or refractive index $n_L$ | Optical thickness $n_H d_H$, or optical thickness $n_L d_L$ [nm] | $n_H d_H / n_L d_L$ |
|---|---|---|---|---|---|
| 31 | TiO$_2$ | 78.77 | 2.50 | 196.93 | 1.0 |
| 32 | Al$_2$O$_3$ | 115.68 | 1.63 | 188.56 | |
| 33 | TiO$_2$ | 88.85 | 2.50 | 222.13 | 0.9 |
| 34 | Al$_2$O$_3$ | 148.38 | 1.63 | 241.86 | |
| 35 | SiO$_2$ | 83.8 | 1.46 | 209.50 | |

Comparative Example 4

On one surface of a glass plate similar to the glass plate used in the example 1, each of TiO$_2$ layers and of Al$_2$O$_3$ layers similar to those of the comparative example 3 are alternately stacked, as presented in Tables 18 and 19, to form a dielectric multilayer for shielding infrared-wavelength region. Note that the comparative example 4 is different from the comparative example 3 in that a dielectric multilayer is not formed on the other surface of the glass plate.

Figure 8:
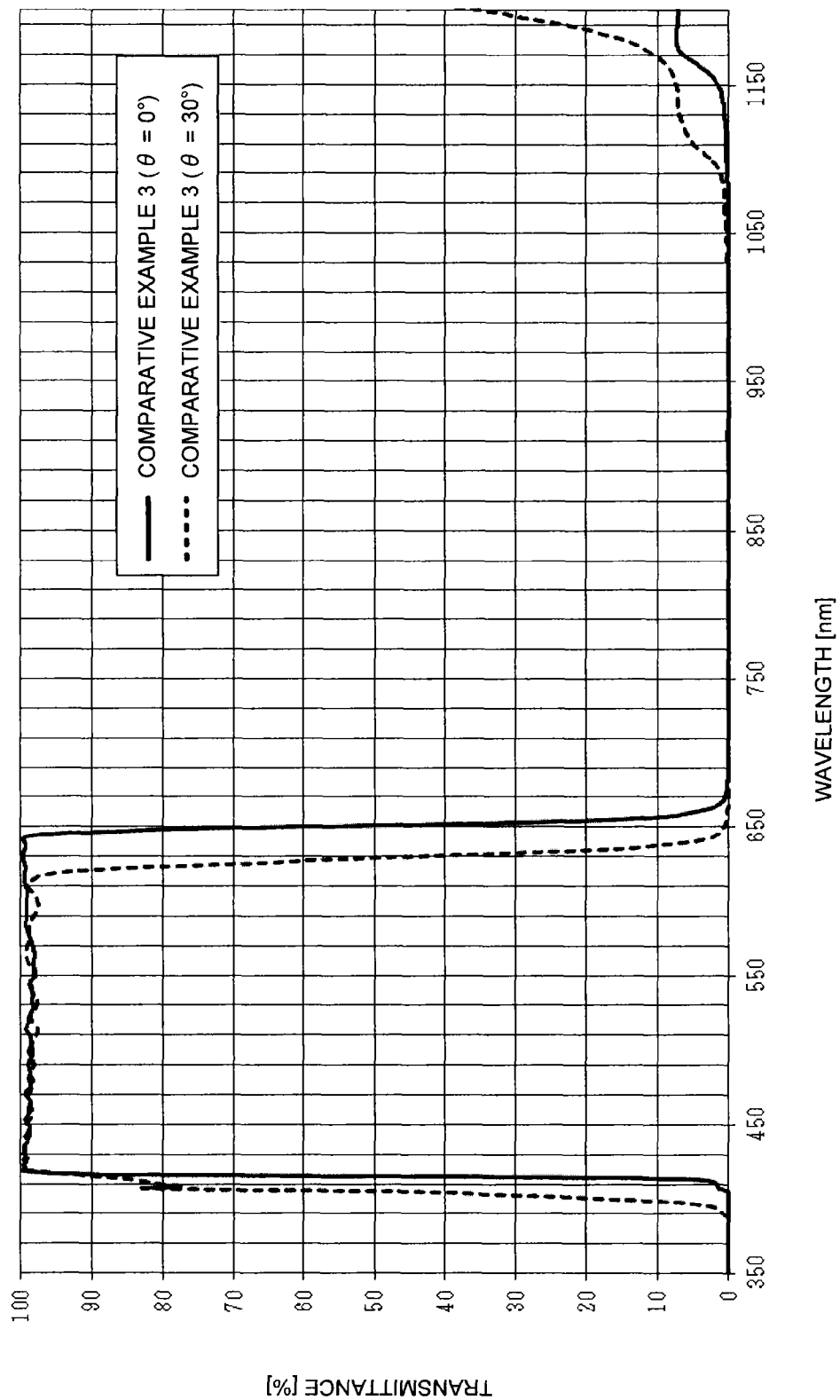
FIG. 8 is a diagram illustrating a spectral transmittance of an optical member of a comparative example 3.
Figure 9:
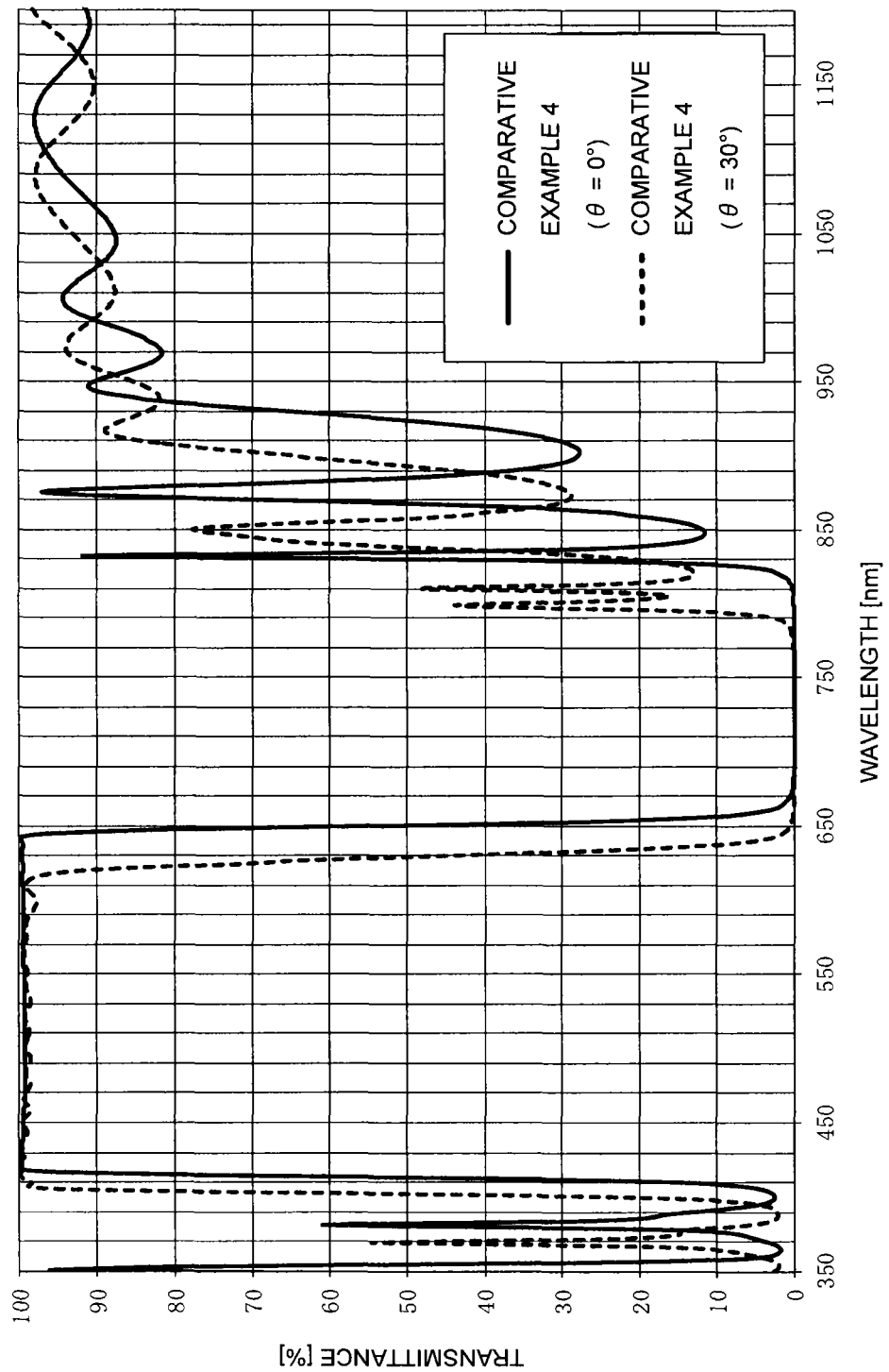
FIG. 9 is a diagram illustrating a spectral transmittance of an optical member of a comparative example 4.

Next, regarding the optical members 1 of the comparative examples 3 and 4, an optical simulation was conducted to determine a spectral transmittance at an incident angle θ of 0°, and a spectral transmittance at an incident angle θ of 30°. Each of FIG. 8 and FIG. 9 illustrates the spectral transmittance at the incident angle θ of 0°, and the spectral transmittance at the incident angle θ of 30° in a wavelength range of 300 to 1300 nm. Note that in the optical simulation, a refractive index of each refractive index layer takes a wavelength dependence into consideration.

As is also apparent from FIG. 8 and FIG. 9, a difference between a 50% transmission wavelength at the incident angle θ of 0° and a 50% transmission wavelength at the incident angle θ of 30° in a cut-off band in the vicinity of 650 nm is large to be 22 nm. Therefore, the incident angle dependence cannot be reduced.

Example 4

Figure 11:
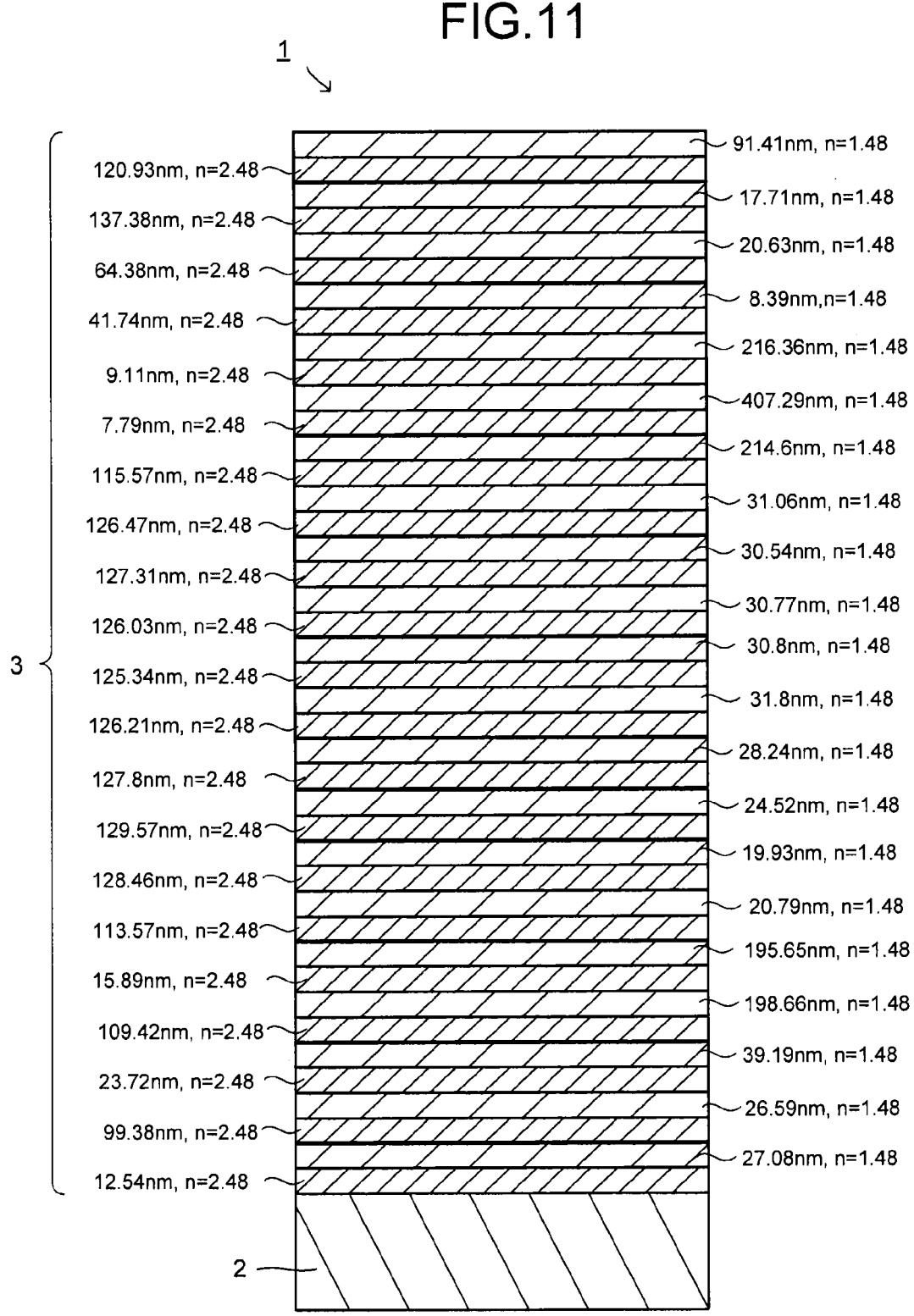
FIG. 11 is a sectional diagram illustrating an optical member of the example 4.

As shown in FIG. 11, on one surface of a soda glass plate with a thickness of 1 mm as a transparent substrate 2, each of $TiO_2$ layers as high-refractive index layers 31 and each of $SiO_2$ layers as low-refractive index layers 32 are alternately stacked, as presented in Tables 20 and 21, to form a first dielectric multilayer 3, thereby manufacturing an optical member 1.

Note that regarding the first dielectric multilayer 3, it is set that a total number of layers as a result of combining the high-refractive index layers 31 and the low-refractive index layers 32 is 42, namely, a total number of unit refractive index layers 33 is 21. In the first dielectric multilayer 3, a number of the unit refractive index layers 33 satisfying a condition of $n_H d_H / n_L d_L \geq 3$ is 13, a number of the unit refractive index layers 33 satisfying a condition of $n_H d_H / n_L d_L \geq 5$ is 13, and a number of the unit refractive index layers 33 satisfying a condition of $5 \leq n_H d_H / n_L d_L \leq 8$ is 8. An average $n_H d_H / n_L d_L$ is 5.2, an average optical thickness $n_H d_H$ is 99.4 nm, and an average optical thickness $n_L d_L$ is 75.8 nm.

Further, layers indicated by the numbers of layers 1 to 10 and 29 to 42 of the first dielectric multilayer 3 also function as an adjusting part. In the adjusting part, $T_H/T_L$ is 0.87. Here, $T_H$ represents an average optical thickness of the high-refractive index layers 31 included in the adjusting part, and $T_L$ represents an average optical thickness of the low-refractive index layers 32 included in the adjusting part.

Further, at an incident angle θ of 0°, the optical member 1 of the example 4 has a transmittance in a range of 360 to 395 nm of less than 3%, an average transmittance in a range of 430 to 630 nm of 95% or more, a minimum transmittance in the range of 430 to 630 nm of 90% or more, and has points where the transmittance indicates 50%, within a range of 415±10 nm, concretely, within a range of 415 to 416 nm, and within a range of 650±15 nm, concretely, within a range of 660 to 661 nm.

TABLE 20

| Number of layer | Material | Physical thickness [nm] | Refractive index $n_H$, or refractive index $n_L$ | Optical thickness $n_H d_H$, or optical thickness $n_L d_L$ [nm] | $n_H d_H / n_L d_L$ |
|---|---|---|---|---|---|
| 1* | $TiO_2$ | 12.54 | 2.48 | 31.10 | 0.8 |
| 2* | $SiO_2$ | 27.08 | 1.48 | 40.08 | |
| 3* | $TiO_2$ | 99.38 | 2.48 | 246.46 | 6.3 |
| 4* | $SiO_2$ | 26.59 | 1.48 | 39.35 | |
| 5* | $TiO_2$ | 23.72 | 2.48 | 58.83 | 1.0 |
| 6* | $SiO_2$ | 39.19 | 1.48 | 58.00 | |
| 7* | $TiO_2$ | 109.42 | 2.48 | 271.36 | 0.9 |
| 8* | $SiO_2$ | 198.66 | 1.48 | 294.02 | |
| 9* | $TiO_2$ | 15.89 | 2.48 | 39.41 | 0.1 |
| 10* | $SiO_2$ | 195.65 | 1.48 | 289.56 | |
| 11 | $TiO_2$ | 113.57 | 2.48 | 281.65 | 9.2 |
| 12 | $SiO_2$ | 20.79 | 1.48 | 30.77 | |
| 13 | $TiO_2$ | 128.46 | 2.48 | 318.58 | 10.8 |
| 14 | $SiO_2$ | 19.93 | 1.48 | 29.50 | |
| 15 | $TiO_2$ | 129.57 | 2.48 | 321.33 | 8.9 |
| 16 | $SiO_2$ | 24.52 | 1.48 | 36.29 | |
| 17 | $TiO_2$ | 127.8 | 2.48 | 316.94 | 7.6 |
| 18 | $SiO_2$ | 28.24 | 1.48 | 41.80 | |
| 19 | $TiO_2$ | 126.21 | 2.48 | 313.00 | 6.7 |
| 20 | $SiO_2$ | 31.8 | 1.48 | 47.06 | |
| 21 | $TiO_2$ | 125.34 | 2.48 | 310.84 | 6.8 |
| 22 | $SiO_2$ | 30.8 | 1.48 | 45.58 | |
| 23 | $TiO_2$ | 126.03 | 2.48 | 312.55 | 6.9 |
| 24 | $SiO_2$ | 30.77 | 1.48 | 45.54 | |
| 25 | $TiO_2$ | 127.31 | 2.48 | 315.73 | 7.0 |
| 26 | $SiO_2$ | 30.54 | 1.48 | 45.20 | |
| 27 | $TiO_2$ | 126.47 | 2.48 | 313.65 | 6.8 |
| 28 | $SiO_2$ | 31.06 | 1.48 | 45.97 | |
| 29* | $TiO_2$ | 115.57 | 2.48 | 286.61 | 0.9 |
| 30* | $SiO_2$ | 214.6 | 1.48 | 317.61 | |

*layer that also functions as adjusting part

TABLE 21

| Number of layer | Material | Physical thickness [nm] | Refractive index $n_H$, or refractive index $n_L$ | Optical thickness $n_H d_H$, or optical thickness $n_L d_L$ [nm] | $n_H d_H / n_L d_L$ |
|---|---|---|---|---|---|
| 31* | $TiO_2$ | 7.79 | 2.48 | 31.10 | 0.0 |
| 32* | $SiO_2$ | 407.29 | 1.48 | 40.08 | |
| 33* | $TiO_2$ | 9.11 | 2.48 | 246.46 | 0.1 |
| 34* | $SiO_2$ | 216.36 | 1.48 | 39.35 | |
| 35* | $TiO_2$ | 41.74 | 2.48 | 58.83 | 8.3 |
| 36* | $SiO_2$ | 8.39 | 1.48 | 58.00 | |
| 37* | $TiO_2$ | 64.38 | 2.48 | 271.36 | 5.2 |
| 38* | $SiO_2$ | 20.63 | 1.48 | 294.02 | |
| 39* | $TiO_2$ | 137.38 | 2.48 | 39.41 | 13.0 |
| 40* | $SiO_2$ | 17.71 | 1.48 | 289.56 | |
| 41* | $TiO_2$ | 120.93 | 2.48 | 281.65 | 2.2 |
| 42* | $SiO_2$ | 91.41 | 1.48 | 30.77 | |

*layer that also functions as adjusting part

Figure 10:
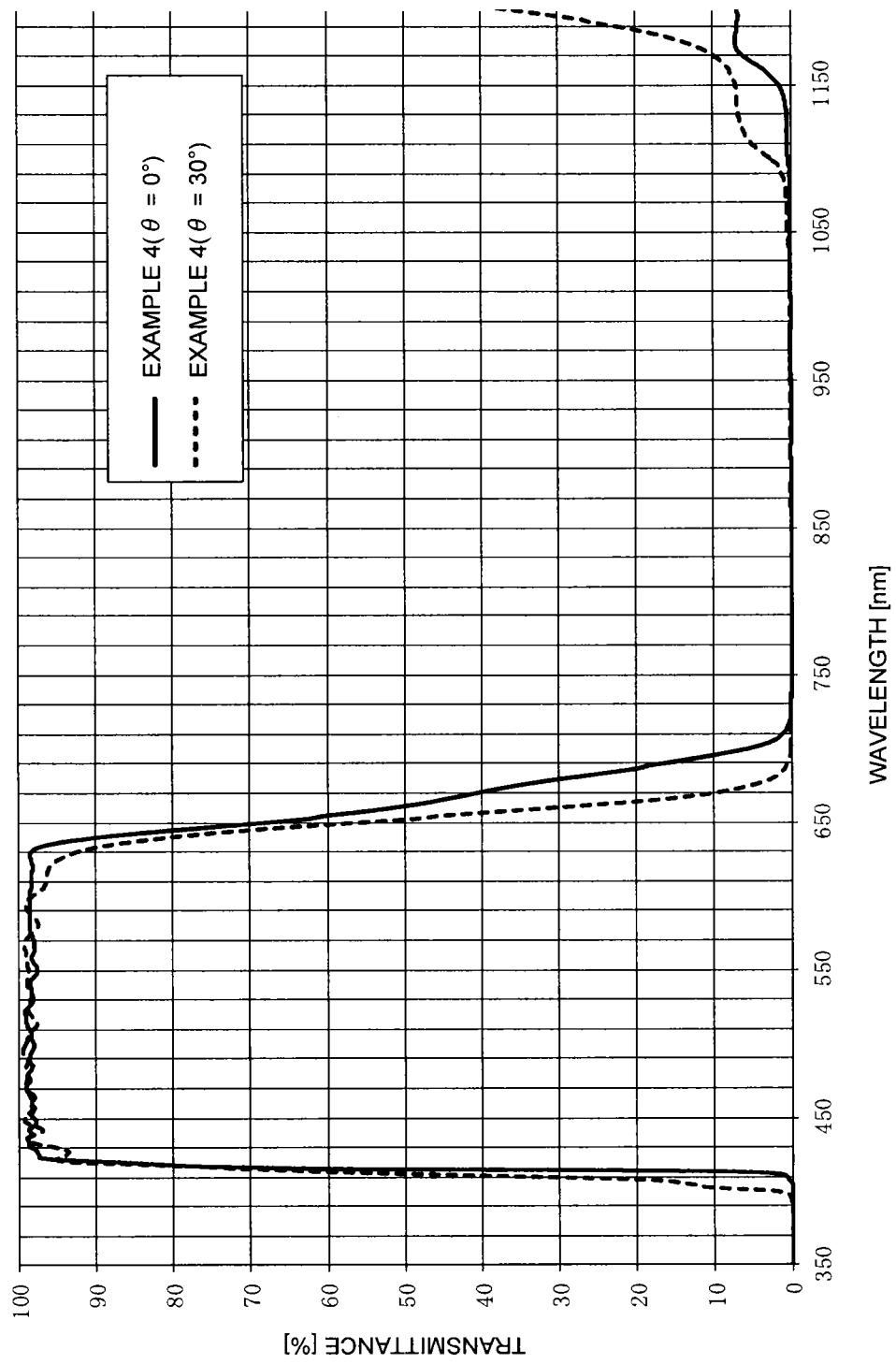
FIG. 10 is a diagram illustrating a spectral transmittance of an optical member of an example 4.

Next, regarding the optical member 1 of the example 4, an optical simulation was conducted to determine a spectral transmittance at the incident angle θ of 0°, and a spectral transmittance at the incident angle θ of 30°. FIG. 10 illustrates the spectral transmittance at the incident angle θ of 0°, and the spectral transmittance at the incident angle θ of 30° in a wavelength range of 350 to 1100 nm. Note that in the optical simulation, a refractive index of each refractive index layer takes a wavelength dependence into consideration.

As is also apparent from FIG. 10, regarding the optical member 1 of the example 4, a difference between a 50% transmission wavelength at the incident angle θ of 0° and a 50% transmission wavelength at the incident angle θ of 30° in a cut-off band in the vicinity of 650 nm can be 8 nm. Therefore, the incident angle dependence can be effectively reduced. Note that, the number of the unit refractive index layers 33 in the first dielectric multilayer 3 satisfying the condition of $n_H d_H/n_L d_L \geq 3$ is 13, and the number of the unit refractive index layers 33 in the first dielectric multilayer 3 satisfying the condition of $n_H d_H/n_L d_L \geq 5$ is 13.

It can be considered as follows. In the optical member 1 of the example 4, a part of the first dielectric multilayer 3 is used as the adjusting part. Therefore, a spectral form is not shifts in a parallel manner, and the spectral form is deformed between at the incident angle θ of 0° and at the incident angle θ of 30° in the cut-off band in the vicinity of 650 nm. Concretely, as illustrated in FIG. 10, in the wavelength region in which the transmittance on the near-infrared side becomes 50 to 90%, a spectral form shift amount when the incident angle θ is changed from 0° to 30° is 10 nm or less, namely the spectral form shift amount is very small. Further, in the wavelength region in which the near-infrared transmittance becomes less than 50%, a spectral form shift amount is larger than the spectral form shift amount in the wavelength region in which the transmittance becomes 50 to 90%. Accordingly, by setting a part of the first dielectric multilayer 3 as the adjusting part, the spectral form shift amount that depends on the incident angle on the near-infrared side can be non-uniform. Therefore, the incident angle dependence in the wavelength range of the red region can be reduced.

What is claimed is:

1. An optical member, comprising:
   a transparent substrate; and
   a dielectric multilayer provided on the transparent substrate, the dielectric multilayer comprising unit stacks each of which consists of: a high-refractive index layer having a refractive index of 2 or more; and a low-refractive index layer having a refractive index of 1.6 or less and stacked on the high-refractive index layer, wherein
   each of the unit stacks has an optical thickness ratio $(n_H d_H/n_L d_L)$ which is a ratio of an optical thickness of the high-refractive index layer $(n_H d_H)$ to an optical thickness of the low-refractive index layer $(n_L d_L)$,
   wherein a total number of the unit stacks is 15 or more,
   wherein a number of the unit stacks having an optical thickness ratio of 3 or more is 10 or more, and
   wherein the dielectric multilayer further comprises at least 5 unit stacks each of which consists of: a high-refractive index layer having a refractive index of 2 or more; and a low-refractive index layer having a refractive index of 1.6 or less and stacked on the high-refractive index layer, the at least 5 unit stacks satisfying in formula: $T_H/T_L \leq 1.5$ where $T_H$ represents an average optical thickness of the high-refractive index layers included in the at least 5 unit stacks and, $T_L$ represents an average optical thickness of the low-refractive index layers included in the at least 5 unit stacks.

2. The optical member according to claim 1, wherein the total number of the unit stacks is 15 or more, and a number of the unit stacks the optical thickness ratio of 5 or more is 10 or more.

3. The optical member according to claim 2, wherein the total number of the unit stacks is 30 or more, and a number of the unit stacks having the optical thickness ratio of 5 or more is 15 or more.

4. The optical member according to claim 2, wherein an average optical thickness ratio of all of the unit stacks is 4.5 to 5.3.

5. The optical member according to claim 1, wherein each of the high-refractive index layers is made of one oxide selected from the group consisting of $TiO_2$, $Nb_2O_5$, $Ta_2O_5$, and a composite oxide thereof, and each of the low-refractive index layers is made of one selected from the group consisting of $SiO_2$, $MgF_2$, and a composite oxide thereof.

6. The optical member according to claim 1, wherein the transparent substrate has a plate shape.

7. The optical member according to claim 1, wherein the transparent substrate has a lens shape.

8. The optical member according to claim 1, wherein the transparent substrate absorbs light in an infrared-wavelength region.

9. The optical member according to claim 1, wherein the optical member is used as a luminosity factor correction filter.

10. The optical member according to claim 1, wherein the at least 5 unit stacks are consecutively stacked.

11. The optical member according to claim 1, wherein the at least 5 unit stacks satisfies formula: $T_H/T_L \leq 1.0$.

12. The optical member according to claim 1, wherein the at least 5 unit stacks satisfies formula: $T_H/T_L \leq 0.9$.

13. The optical member according to claim 1, wherein the at least 5 unit stacks satisfies formula: $T_H/T_L \geq 0.1$.

14. The optical member according to claim 1, wherein the at least 5 unit stacks satisfies formula: $T_H/T_L \geq 0.3$.

* * * * *